United States Patent
Kim

(10) Patent No.: US 9,898,652 B2
(45) Date of Patent: Feb. 20, 2018

(54) VEHICLE, METHOD FOR CONTROLLING THE SAME AND GESTURE RECOGNITION APPARATUS THEREIN

(71) Applicant: HYUNDAI MOTOR COMPANY, Seoul (KR)

(72) Inventor: Seona Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 248 days.

(21) Appl. No.: 14/822,759

(22) Filed: Aug. 10, 2015

(65) Prior Publication Data

US 2016/0210504 A1 Jul. 21, 2016

(30) Foreign Application Priority Data

Jan. 21, 2015 (KR) .......................... 10-2015-0009823

(51) Int. Cl.
| | | |
|---|---|---|
| G06K 9/00 | (2006.01) | |
| G06F 3/01 | (2006.01) | |
| G06F 21/32 | (2013.01) | |
| G06F 3/03 | (2006.01) | |

(52) U.S. Cl.
CPC ......... *G06K 9/00382* (2013.01); *G06F 3/017* (2013.01); *G06F 3/0304* (2013.01); *G06F 21/32* (2013.01); *G06K 9/00832* (2013.01); B60K 2350/1052 (2013.01); G06K 2009/00932 (2013.01)

(58) Field of Classification Search
CPC .... G06K 9/00382; G06K 9/6201; G06K 9/52; G06K 2009/00932; G06F 3/0304; G06F 21/32; G06F 3/017; B60K 2350/1052
See application file for complete search history.

(56) References Cited

U.S. PATENT DOCUMENTS

| | | | | |
|---|---|---|---|---|
| 7,702,130 B2 * | 4/2010 | Im | ........................... | G06F 3/017 382/103 |
| 7,957,563 B2 * | 6/2011 | Kiyomizu | .............. | A61B 5/117 356/71 |
| 2003/0086588 A1 * | 5/2003 | Shinada | .................. | B60R 25/04 382/104 |

(Continued)

FOREIGN PATENT DOCUMENTS

| | | |
|---|---|---|
| JP | 2007-115072 A | 5/2007 |
| JP | 2007-151897 A | 6/2007 |

(Continued)

*Primary Examiner* — Samir Ahmed
(74) *Attorney, Agent, or Firm* — McDermott Will & Emery LLP

(57) ABSTRACT

Provided is a vehicle including a storage unit that stores a vein pattern lookup table including a plurality of reference vein pattern images according to a rotation angle of a driver's hand. The vehicle also includes an image acquisition unit that acquires a driver's image including an image of the driver's hand. The vehicle also includes a controller that extracts a vein pattern image of the driver's hand from the driver's image, authenticates the driver by comparing the vein pattern image with the vein pattern lookup table, and determines a gesture of the driver including at least one of a position of the driver's hand, a direction directed by the driver's hand and a rotation angle of the driver's hand based on the vein pattern image.

21 Claims, 22 Drawing Sheets

(56) References Cited

U.S. PATENT DOCUMENTS

| | | | | |
|---|---|---|---|---|
| 2007/0058841 | A1* | 3/2007 | Miura | G06K 9/00013 382/115 |
| 2007/0098223 | A1* | 5/2007 | Kamata | A61B 5/117 382/115 |
| 2008/0063244 | A1* | 3/2008 | Tanaka | G06K 9/00033 382/115 |
| 2008/0068591 | A1* | 3/2008 | Kono | G06K 9/00 356/71 |
| 2009/0245585 | A1* | 10/2009 | Manabe | G06K 9/00033 382/107 |
| 2010/0226539 | A1* | 9/2010 | Ishii | G06F 3/0425 382/104 |
| 2012/0002846 | A1* | 1/2012 | Yokoi | G06K 9/6265 382/115 |
| 2013/0136317 | A1* | 5/2013 | Shinzaki | G06F 21/32 382/115 |
| 2013/0329031 | A1* | 12/2013 | Miura | G06K 9/00013 348/77 |

FOREIGN PATENT DOCUMENTS

| | | |
|---|---|---|
| JP | 2010-244405 A | 10/2010 |
| KR | 10-2003-0002954 A | 1/2003 |
| KR | 10-2014-0087866 A | 7/2014 |

\* cited by examiner

| ROTATION ANGLE | VEIN PATTERN |
|---|---|
| 0 |  |
| 30 |  |
| 60 |  |
| 90 | |

(a)

(b)

(c)

VEHICLE, METHOD FOR CONTROLLING THE SAME AND GESTURE RECOGNITION APPARATUS THEREIN

CROSS-REFERENCE TO RELATED APPLICATION

This application claims the benefit of Korean Patent Application No. 10-2015-0009823, filed on Jan. 21, 2015 in the Korean Intellectual Property Office, the disclosure of which is incorporated herein in its entirety by reference.

TECHNICAL FIELD

Embodiments of the present invention relate to a vehicle, a method for controlling the same, and a gesture recognition apparatus therein, and more particularly, to a vehicle that recognizes a driver's gesture, a method for controlling the same, and a gesture recognition apparatus therein.

BACKGROUND

In general, vehicles are transportation devices that travel along a road or railroad using a fossil fuel or electricity as a power source.

Recent vehicles generally include an audio device and a video device so that a driver can listen to music or see an image during driving, in addition to simply performing a function of transporting goods and passengers. A navigation device that displays a route to the driver's destination is also widely installed in vehicles. Furthermore, an audio/video/navigation (AVN) device in which the audio device, the video device and the navigation device are integrated, is recently installed in the vehicles.

When the driver tries to manipulate the AVN device during driving, the driver's vision is distracted, and the driver's hand needs to be moved from the steering wheel to the AVN device and therefore risk of accidents may increase.

SUMMARY

Therefore, it is an aspect of the present disclosure to provide a vehicle that detects a driver's gesture and recognizes control instructions corresponding to the detected gesture. A method for controlling the vehicle and a gesture recognition apparatus included in the vehicle are also provided.

It is another aspect of the present disclosure to provide a vehicle that detects a vein pattern formed in the driver's hand so as to more precisely recognize the driver's gesture and detect the driver's gesture based on the detected vein pattern. A method for controlling the vehicle and a gesture recognition apparatus included in the vehicle are also provided.

Additional aspects of the disclosure will be set forth in part in the description which follows and, in part, will be obvious from the description, or may be learned by practice of the disclosure.

In accordance with one aspect of the present disclosure, a vehicle includes a storage unit that stores a vein pattern lookup table including a plurality of reference vein pattern images according to a rotation angle of a driver's hand. The vehicle also includes an image acquisition unit that acquires a driver's image including an image of the driver's hand. The vehicle also includes a controller that extracts a vein pattern image of the driver's hand from the driver's image, authenticates the driver by comparing the vein pattern image with the vein pattern lookup table, and determines a gesture of the driver including at least one of a position of the driver's hand, a direction directed by the driver's hand and a rotation angle of the driver's hand based on the vein pattern image.

The vehicle may further include a display that displays a plurality of reference gesture images according to the rotation angle of the driver's hand.

When one reference gesture image among the plurality of reference gesture images is displayed, the controller may acquire a reference driver's image corresponding to the one reference gesture image.

The controller may binarize the reference driver's image and may extract a reference vein pattern image from the binarized reference driver's image.

The controller may generate the vein pattern lookup table based on the reference vein pattern image.

The controller may binarize the driver's image, may extract a vein pattern image from the binarized driver's image, and may determine a position of the driver's hand based on a position of the vein pattern image.

The controller may rotation-transform the vein pattern image based on the plurality of reference vein pattern images and may determine a direction directed by the driver's hand based on a rotation angle of the vein pattern.

The controller may transform the size of the vein pattern image based on the plurality of reference vein pattern images and may determine a height of the driver's hand based on a size transformation ratio of the vein pattern image.

The controller may search for a reference vein pattern matched to the vein pattern image among the plurality of reference vein pattern images and may determine the rotation angle of the driver's hand based on the reference vein pattern matched to the vein pattern image.

The controller may determine a continuous driver gesture by processing a plurality of driver's images continuously acquired by the image acquisition unit and may determine the driver's movement based on the continuous driver gesture.

The controller may determine the driver's control instructions based on the driver's movement.

When a plurality of vein pattern images are extracted from the driver's image, the controller may distinguish a plurality of drivers by comparing the plurality of vein pattern images with the vein pattern lookup table and may authenticate the plurality of drivers distinguished based on the vein pattern image.

In accordance with another aspect of the present disclosure, a method for controlling a vehicle, includes storing a vein pattern lookup table including a plurality of reference vein pattern images according to a rotation angle of a driver's hand. The method also includes acquiring a driver's image including an image of the driver's hand; extracting a vein pattern image of the driver's hand from the driver's image. The method also includes authenticating the driver by comparing the vein pattern image with the vein pattern lookup table. The method also includes determining a gesture of the driver including at least one of a position of the driver's hand, a direction directed by the driver's hand and a rotation angle of the driver's hand based on the vein pattern image.

The storing of the vein pattern lookup table may include displaying a plurality of reference gesture images according to the rotation angle of the driver's hand, acquiring a reference driver's image corresponding to the reference gesture image, extracting a reference vein pattern image from the reference driver's image, and generating the vein pattern lookup table based on the reference vein pattern image.

The determining of the driver's gesture based on the vein pattern image may include rotation-transforming the vein pattern image based on the plurality of reference vein pattern images and determining a direction directed by the driver's hand based on a rotation angle of the vein pattern.

The determining of the driver's gesture based on the vein pattern image may include transforming the size of the vein pattern image based on the plurality of reference vein pattern images and determining a height of the driver's hand based on a size transformation ratio of the vein pattern image.

The determining of the driver's gesture based on the vein pattern image may include searching for a reference vein pattern matched to the vein pattern image among the plurality of reference vein pattern images and determining the rotation angle of the driver's hand based on the reference vein pattern matched to the vein pattern image.

The method may further include determining a continuous driver gesture by processing a plurality of driver's images continuously acquired by an image acquisition unit, determining the driver's movement based on the continuous driver gesture, and determining the driver's control instructions based on the driver's movement.

The authenticating of the driver may include, when a plurality of vein pattern images are extracted from the driver's image, distinguishing a plurality of drivers by comparing the plurality of vein pattern images with the vein pattern lookup table and authenticating the plurality of drivers distinguished based on the vein pattern image.

In accordance with still another aspect of the present disclosure, a gesture recognition apparatus includes a memory that stores a vein pattern lookup table including a plurality of reference vain pattern images according to a rotation angle of a driver's hand. The apparatus also includes a camera module that acquires a driver's image including an image of the driver's hand. The apparatus also includes a graphic processor that extracts a vein pattern image of the driver's hand from the driver's image and compares the vein pattern image with the vein pattern lookup table. The apparatus also includes a main processor that determines the driver's gesture including at least one of a position of the driver's hand, a direction directed by the driver's hand and a rotation angle of the driver's hand based on the vein pattern image.

The graphic processor may binarize the driver's image and may extract a vein pattern image from the binarized driver's image, and the main processor may determine a position of the driver's hand based on a position of the vein pattern image.

The graphic processor may rotation-transform the vein pattern image based on the plurality of reference vein pattern images, and the main processor may determine a direction directed by the driver's hand based on a rotation angle of the vein pattern.

The graphic processor may transform the size of the vein pattern image based on the plurality of reference vein pattern images, and the main processor may determine a height of the driver's hand based on a size transformation ratio of the vein pattern image.

The graphic processor may search for a reference vein pattern matched to the vein pattern image among the plurality of reference vein pattern images, and the main processor may determine a rotation angle of the driver's hand based on the reference vein pattern matched to the vein pattern image.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Figure 1:
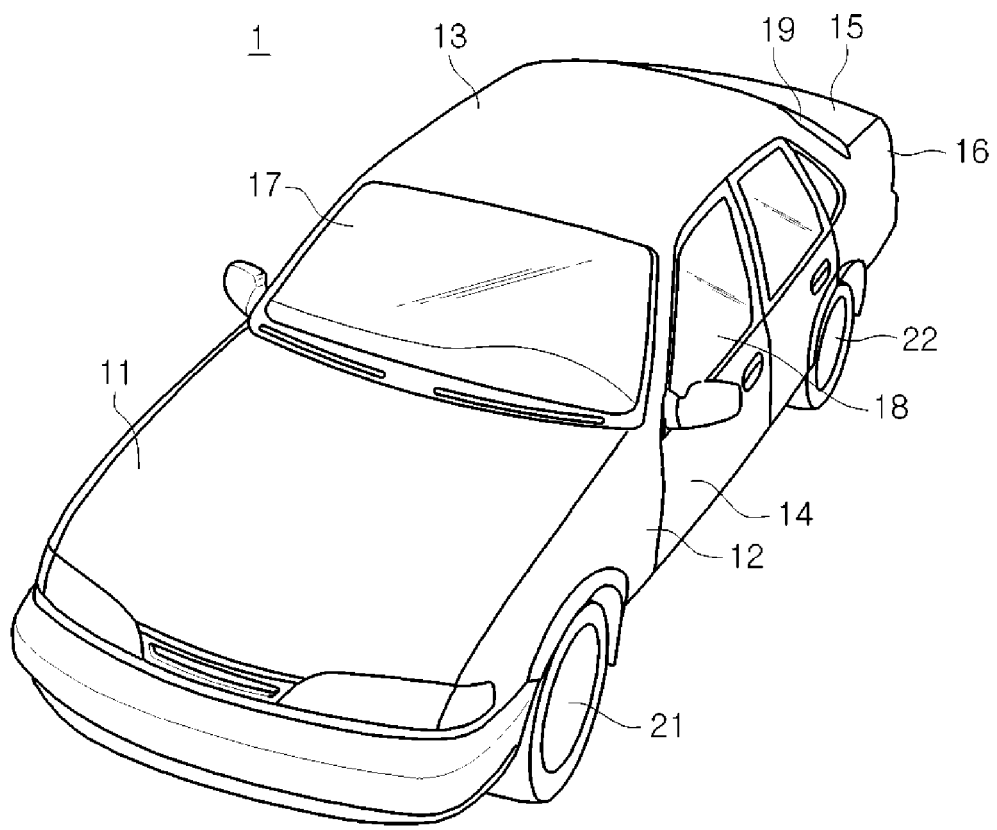
FIG. 1 is a view of the exterior of a vehicle, according to an embodiment of the present invention.

Embodiments described in the specification and configurations shown in the drawings of the specification are merely exemplary embodiments of the present invention, and there may be various modified examples that may replace the embodiments and the drawings of the specification at the time of filing an application of the present invention.

Hereinafter, an embodiment of the present invention will be described in detail with reference to the accompanying drawings.

Figure 2:
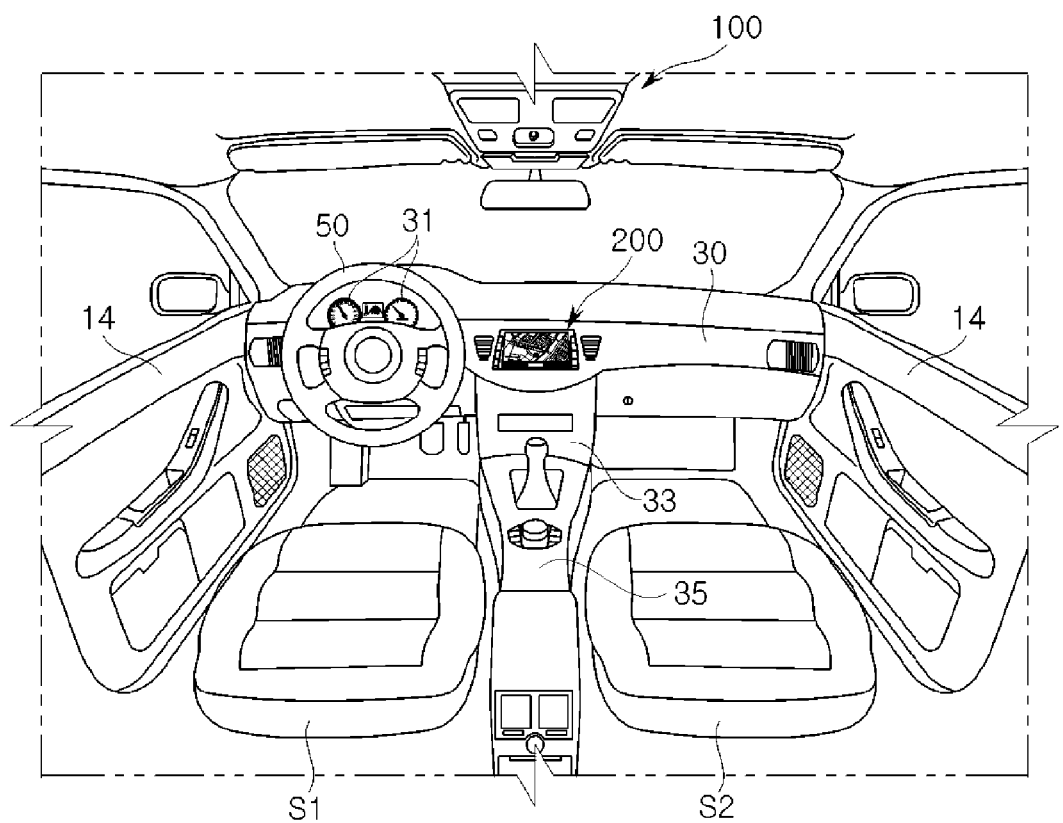
FIG. 2 is a view of an inside of the vehicle, according to an embodiment of the present invention.

FIG. 1 is a view of the exterior of a vehicle, according to an embodiment of the present invention, and FIG. 2 is a view of an inside of the vehicle, according to an embodiment of the present invention.

Referring to FIGS. 1 and 2, a vehicle 1, according to an embodiment of the present invention, may include bodies 11 through 16 that constitute the exterior of the vehicle 1, a chassis (not shown) that supports components inside the vehicle 1, and wheels 21 and 22 that move the bodies 11 through 16 and the chassis.

The wheels 21 and 22 include a front wheel 21 disposed in front of the vehicle 1 and a rear wheel 22 disposed in rear of the vehicle 1, and the bodies 11 through 16 and the chassis may be moved forward or backward by rotation of the wheels 21 and 22.

The bodies 11 through 16 may include a hood 11, a front fender 12, a roof panel 13, a door 14, a trunk lid 15, and a quarter panel 16.

Also, a front window 17 installed in front of the bodies 11 through 16, a side window 18 installed at the door 14, and a rear window 19 installed in rear of the bodies 11 through 16 may be disposed outside the bodies 11 through 16.

Seats S1 and S2 on which passengers sit, a dashboard 30 that controls an operation of the vehicle 1 and has various meters for displaying driving information of the vehicle 1 disposed in the dashboard 30, a steering wheel 50 that manipulates a driving direction of the vehicle 1, and a gesture recognition apparatus 100 that recognizes a driver's gesture may be disposed in the bodies 11 through 16.

The seats S1 and S2 may allow the driver to manipulate the vehicle 1 in a comfortable and stable posture and may include a driver seat S1 in which the driver sits, a passenger seat S2 in which a fellow passenger sits, and a back seat (not shown) placed in rear of the vehicle 1.

A meter board 31 is disposed in the dashboard 30 and indicates information regarding driving. The meter board 31 includes components such as a speedometer, a fuel meter, an automatic transmission selection lever display lamp, a tachometer, and a distance meter. A center fascia 33 has a control panel for manipulating attached devices included in the vehicle 1 disposed in the center fascia 33. A center console 35 has a gear stick and a parking brake stick disposed in the center console 35. And an audio/video/navigation (AVN) device 200 that outputs audio (e.g., music) and video (e.g., an image) may be disposed in the dashboard 30.

The center fascia 33 is disposed between the driver seat S1 and the passenger seat S2, and a manipulation unit for adjusting an audio device, an air conditioner, and a heater, a vent for the air conditioner for adjusting temperature inside the bodies 11 through 16, and a cigar jack may be installed in the center fascia 33.

The center console 35 may be disposed below the center fascia 33 between the driver seat S1 and the passenger seat S2, and the gear stick for transmission and the parking brake stick for parking may be installed in the center console 35.

The AVN device 200 is a device that outputs audio or video/image according to the driver's control instructions. In detail, the AVN device 200 may play music, moving pictures (e.g., videos), or may guide a route to a destination based on the driver's control instructions.

The steering wheel 50 is attached to the dashboard 30 to be rotatable around a steering axis, and the driver may rotate the steering wheel 50 clockwise or counterclockwise so as to change a progression direction of the vehicle 1.

The gesture recognition apparatus 100 may be disposed on a ceiling inside the bodies 11 through 16, as illustrated in FIG. 2. However, the gesture recognition apparatus 100 is not limited to be disposed on the ceiling inside the bodies 11 through 16 and may be disposed in a position in which the driver's hand may be detected, such as in dashboard 30, in the center fascia 33, or in the center console 35.

A configuration and an operation of the gesture recognition apparatus 100 will be described below in detail.

Various components may be disposed in the chassis (not shown in FIGS. 1 and 2). These components may include, for example, a power generation device that generates power for moving the vehicle 1 by combusting a fuel, a fuel device that supplies the fuel to the power generation device, a cooling device for cooling the heated power generation device, an exhaust device that discharges gas generated by combustion of the fuel, a power transmission device that transmits the power generated by the power generation device to the wheels 21 and 22, a steering device that transmits the progression direction of the vehicle 1 manipulated by the steering wheel 50 to the wheels 21 and 22, a brake device that stops rotation of the wheels 21 and 22, and a suspension device that absorbs vibration of the wheels 21 and 22 caused by a road.

Hereinafter, a configuration and an operation of the gesture recognition apparatus 100 according to an embodiment of the present invention will be described.

Figure 3:
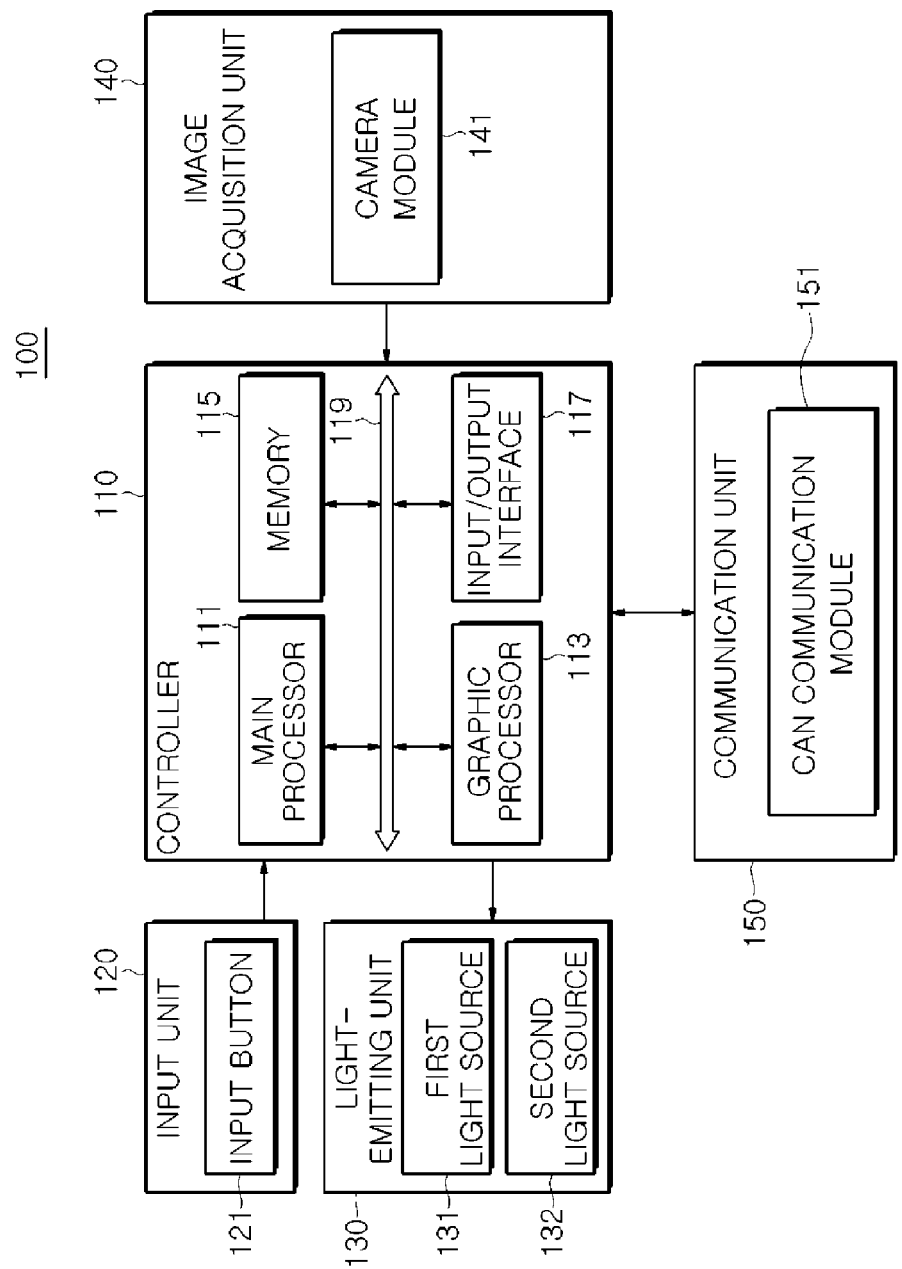
FIG. 3 is a diagram of a configuration of a gesture recognition, apparatus according to an embodiment of the present invention.
Figure 4:
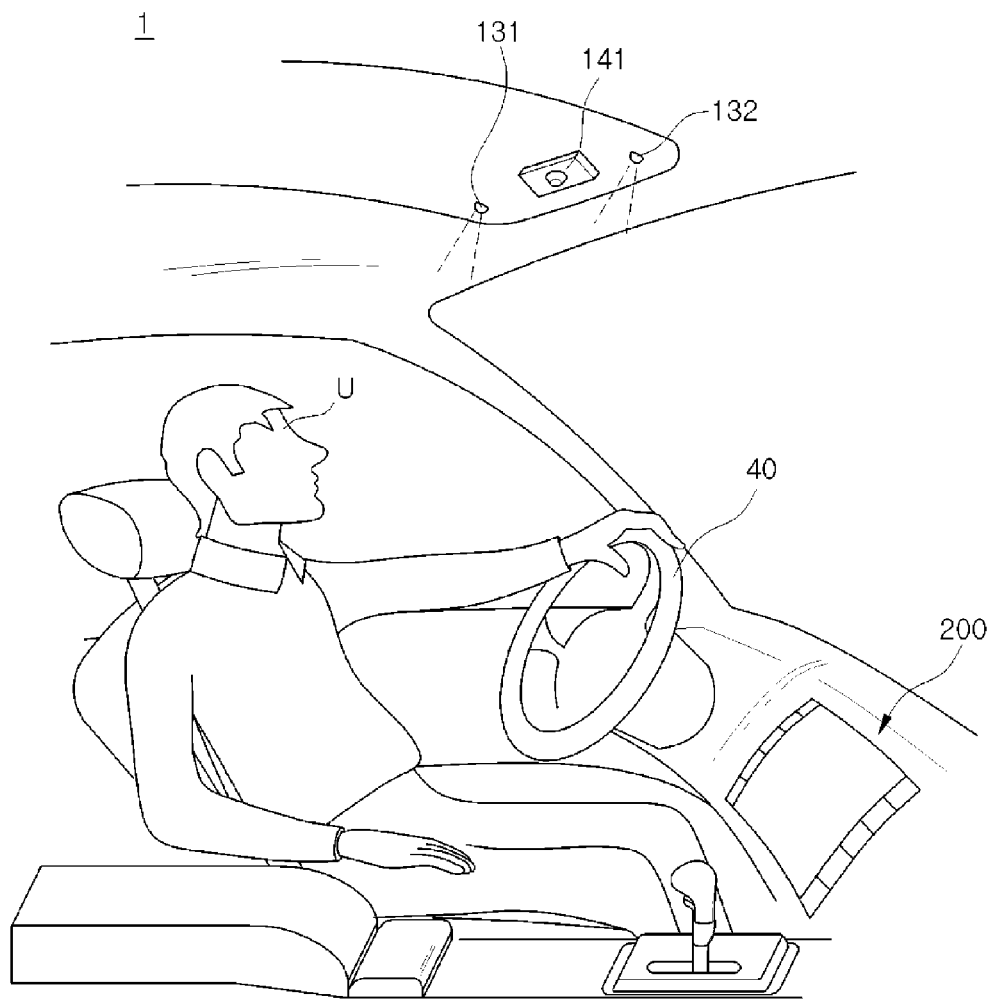
FIG. 4 is a view of a light-emitting unit and an image acquisition unit included in the gesture recognition apparatus, according to an embodiment of the present invention.

FIG. 3 is a diagram of a configuration of a gesture recognition apparatus according to an embodiment of the present invention, and FIG. 4 is a view of a light-emitting unit and an image acquisition unit included in the gesture recognition apparatus, according to an embodiment of the present invention.

Referring to FIGS. 3 and 4, the gesture recognition apparatus 100 includes an input unit 120 that receives control instructions from the driver, a light-emitting unit 130 that emits light toward a part of the driver's body, an image acquisition unit 140 that receives light reflected from the part of the driver's body, a communication unit 150 that communicates with other electronic devices included in the vehicle 1, and a controller 110 that controls an overall operation of the gesture recognition apparatus 100.

The input unit 120 may include an input button 121 that receives various control instructions for controlling an operation of the gesture recognition apparatus 100 from the driver. For example, the input button 121 may receive gesture recognition activation instructions for activating gesture recognition of the gesture recognition apparatus 100 from the user or gesture recognition deactivation instructions for deactivating gesture recognition.

The input button 121 can be a push switch, a toggle switch, a sliding switch, a membrane switch, a touch switch, or a dial.

The light-emitting unit 130 may include a first light source 131 and a second light source 132 that emit infrared rays.

The first light source 131 and the second light source 132 may be installed on the ceiling inside the bodies 11 through 16 and may emit the infrared rays downward, as illustrated in FIG. 4.

However, positions of the first light source 131 and the second light source 132 are not limited to the ceiling inside the bodies 11 through 16. For example, the first light source 131 and the second light source 132 may be installed in the center fascia 33 disposed in front of the driver or in the center console 35 disposed in a lateral direction of the driver. In addition, the first light source 131 may be disposed on the ceiling inside the bodies 11 through 16, and the second light source 132 may be disposed in the center fascia 33. Also, the first light source 131 may be disposed in the center console 35, and the second light source 132 may be disposed in the center fascia 33.

In this way, the positions of the first light source 131 and the second light source 132 are not limited to particular positions and may be positions where the first light source 131 and the second light source 132 may emit the infrared rays toward a part of a user's body.

A light emitting diode (LED) that emits the infrared rays, a light amplification by stimulated emission of radiation (LASER), or an infrared lamp may be used as the first light source 131 and the second light source 132.

The image acquisition unit 140 may include a camera module 141 that receivers the infrared rays reflected from the part of the driver's body.

The camera module 141 may be disposed on the ceiling inside the bodies 11 through 16 and may acquire a downward infrared image from the ceiling inside the bodies 11 through 16, as illustrated in FIG. 4.

However, the position of the camera module 141 is not limited to the ceiling inside the bodies 11 through 16. For example, the camera module 141 may be installed in the center fascia 33 disposed in front of the driver or may be disposed in the center console 35 disposed in the lateral direction of the driver. When the camera module 141 is installed in the center fascia 33, the camera module 141 may acquire a backward infrared image from the center fascia 33. Also, when the camera module 141 is installed in the center console 35, the camera module 141 may acquire an upward infrared image from the center console 35.

In this way, the position of the camera module 141 is not limited to the particular position and may be a position where the camera module 141 may be adjacent to a user and may acquire an image of the part of the user's body.

The camera module 141 may include a lens (not shown) that focuses light and an image sensor (not shown) that converts light into electrical signals.

Here, an infrared image sensor that receives light having a wavelength corresponding to the infrared rays, or a general use image sensor that receives light including infrared rays and visible rays may be used as the image sensor. In particular, when the general use image sensor is used as the image sensor, the camera module 141 may further include an infrared filter (not shown) that blocks the visible rays and transmits only the infrared rays.

A complementary metal oxide semiconductor (CMOS) sensor or a charge coupled device (CCD) sensor may be used as the image sensor.

The communication unit 150 may include a control area network (CAN) communication module 151 that communicates with various electronic devices included in the vehicle 1 using a CAN communication protocol.

A case where the gesture recognition apparatus 100 communicates with other electronic devices included in the vehicle using the CAN communication module 151, will be described below in detail.

The controller 110 may include an input/output interface 117 that mediates data input/output between various components included in the gesture recognition apparatus 100 and the controller 110, a memory 115 for storing a program (e.g., software code) and data, a graphic processor 113 that performs image processing, and a main processor 111 that performs an operation (e.g., arithmetic operation) according to the program and the data stored in the memory 115. Also, the controller 110 may include a system bus 119 that is a path of data transmission/reception among the input/output interface 117, the memory 115, the graphic processor 113, and the main processor 111.

The input/output interface 117 may receive control instruction data from the input unit 120, image data from the image acquisition unit 140, or communication data from the communication unit 150 and may transmit the received data to the main processor 111, the graphic processor 113, or the memory 115 via the system bus 119.

Also, the input/output interface 117 may transmit various control signals and data output by the main processor 111 to the communication unit 150.

The memory 115 may store a control program and control data for controlling the operation of the gesture recognition apparatus 100 or may store control signals output by the main processor 111 and image data output by the graphic processor 113.

The memory 115 may include a volatile memory (not shown), such as a static random access memory (S-RAM), or a dynamic random access memory (D-RAM), and a non-volatile memory (not shown), such as a flash memory, a read only memory (ROM), an erasable programmable read only memory (EPROM), or an electrically erasable programmable read only memory (EEPROM).

The non-volatile memory may operate as an auxiliary memory device of the volatile memory and may store a control program and control data for controlling an operation of the gesture recognition apparatus 100. Also, the non-volatile memory may retain stored data even when power of the gesture recognition apparatus 100 is cut off and may store a vein pattern lookup table (LUT) for driver authentication.

The volatile memory may load the control program and the control data from the non-volatile memory and may store control signals output by the main processor 111 and image data output by the graphic processor 113. The volatile memory may lose the stored data when the power of the gesture recognition apparatus 100 is cut off, unlike the non-volatile memory.

The graphic processor 113 processes the image data received from the image acquisition unit 140 or the image data stored in the memory 115. For example, the graphic processor 113 may binarize the image data received from the camera module 141 of the image acquisition unit 140, or may rotate/transform the image data, or may change the size of the image data. Also, the graphic processor 113 may determine whether two images are matched to each other, by comparing the two images with each other.

The main processor 111 may perform operations for controlling the input unit 120, the light-emitting unit 130, the image acquisition unit 140, and the communication unit 150 according to the control program and the control data stored in the memory 115.

For example, the main processor 111 may process the driver's control instructions received from the input button 121 of the input unit 120 and may output control signals corresponding to the input control instructions.

Also, the main processor 111 may recognize the driver's control instructions based on the result of image processing of the graphic processor 113 and may output control signals corresponding to the recognized control instructions. In detail, the main processor 111 may determine the driver's gesture based on the result of image processing of the graphic processor 113 and may determine the driver's control instructions based on the continued driver's gesture. Also, the main processor 111 may transmit the determined driver's control instructions to various electronic devices included in the vehicle 1, for example, an AVN device, through the communication unit 150.

As described above, the main processor 111 and the graphic processor 113 have been described to be distinguished from each other. However, embodiments of the present invention are not limited thereto. The main processor 111 and the graphic processor 113 may be provided as one processor.

In some aspects, the controller 110 may recognize the driver's control instructions based on the driver's gesture and may control operations of various components included in the gesture recognition apparatus 100 according to the recognized driver's control instructions.

Thus, an operation of the gesture recognition apparatus 100 that will be described below may be interpreted to be performed by a control operation of the controller 110.

As above, the configuration of the gesture recognition apparatus 100 has been described. However, an electronic device included in the vehicle 1 is not limited to the gesture recognition apparatus 100, and various electronic devices may communicate with each other.

Figure 5:
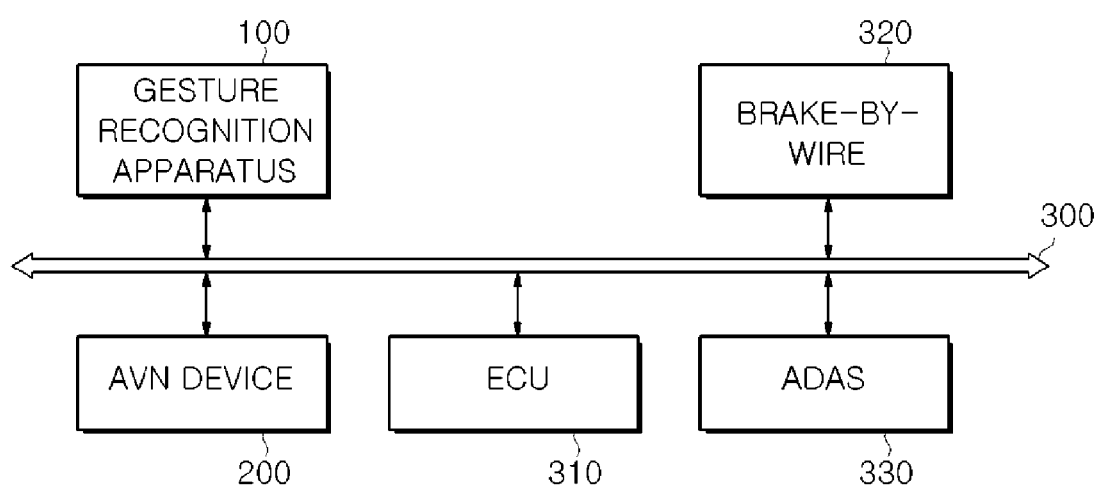
FIG. 5 is a diagram of electrical connection between various electronic devices included in the vehicle, according to an embodiment of the present invention.
Figure 6:
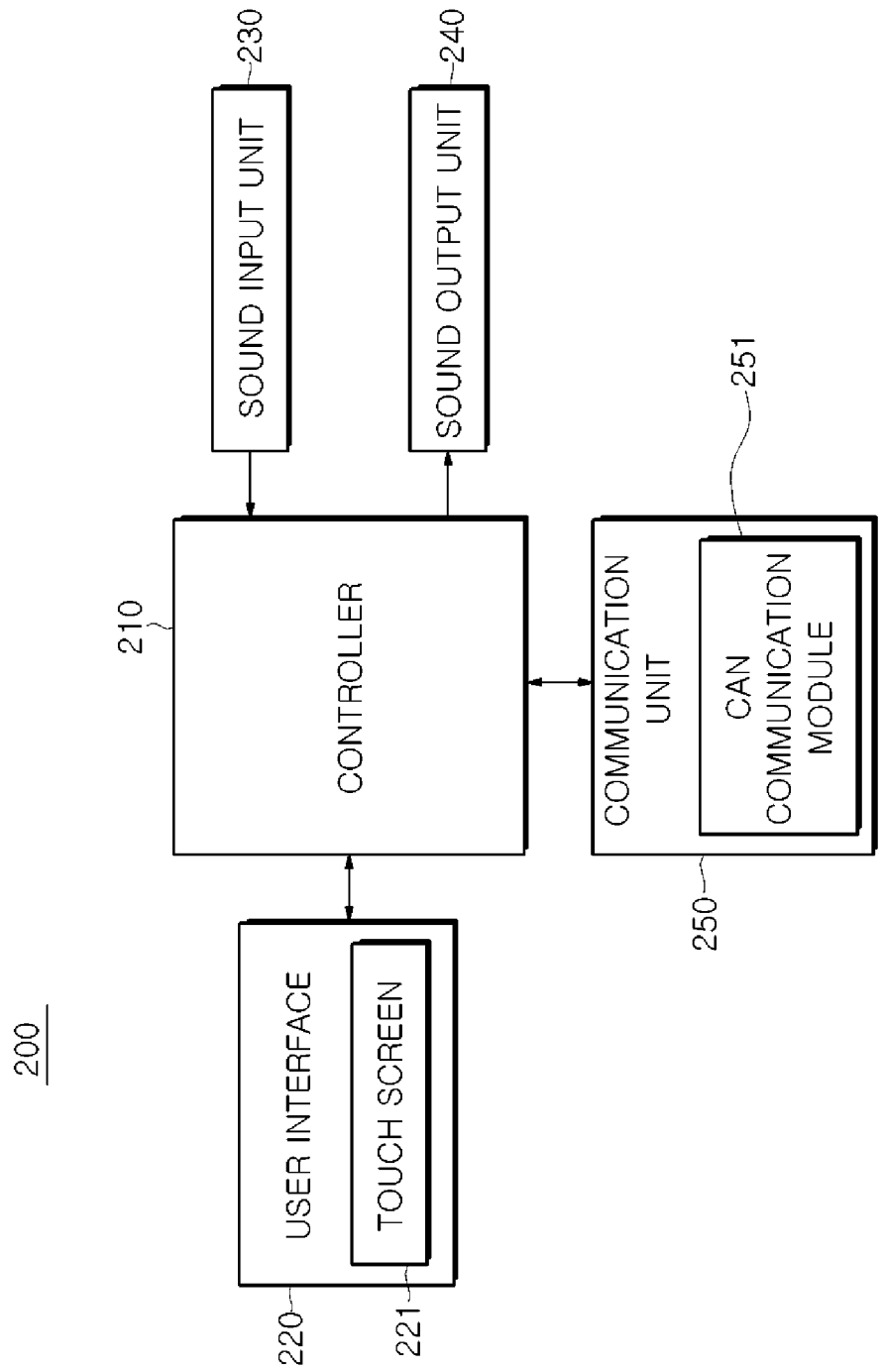
FIG. 6 is a diagram of a configuration of an audio/video/navigation (AVN) device included in the vehicle, according to an embodiment of the present invention.

FIG. 5 is a diagram of electrical connection between various electronic devices included in the vehicle according to an embodiment of the present invention, and FIG. 6 is a diagram of a configuration of an audio/video/navigation (AVN) device included in the vehicle according to an embodiment of the present invention.

As illustrated in FIG. 5, the vehicle 1 may include various electronic devices 200, 310, 320, and 330 together with the gesture recognition apparatus 100.

For example, the vehicle 1 may include the above-described AVN device 200, an engine control unit (ECU) 310 that adjusts a fuel supplied to an engine of the vehicle 1 and controls an operation of the engine, a brake-by-wire 320 that controls a brake of the vehicle 1, and an advanced driver assistance system (ADAS) 330 that assists with the driver's driving by including a front collision prevention function, a lane deviation warning function, a blind spot surveillance function, and a rear surveillance function, as well as the gesture recognition apparatus 100.

Also, various electronic devices 100, 200, 310, 320, and 330 included in the vehicle 1 may transmit/receive data to/from each other through a CAN communication line 300, as illustrated in FIG. 5. In other words, the gesture recognition apparatus 100 may transmit data to other electronic devices 200, 310, 320, and 330 and may receive data from other electronic devices 200, 310, 320, and 330, through the CAN communication line 300

For example, the gesture recognition apparatus 100 may receive control instructions regarding the AVN device 200 through the driver's gesture and may transmit the input control instructions to the AVN device 200 through CAN communication.

Also, when a vein pattern is registered, the gesture recognition apparatus 100 may guide a reference gesture to the driver using the AVN device 200 and may generate a vein pattern lookup table for driver authentication based on the reference gesture guided by the AVN device 200.

The AVN device 200 among various electronic devices 100, 200, 310, 320, and 330 illustrated in FIG. 5 will be briefly described.

As described above, the AVN device 200 may play a music or moving picture or may guide a route to a destination based on the driver's control instructions.

The AVN device 200 may include a user interface 220 that interacts with the driver and displays an image, a sound input unit 230 to which a sound is input, a sound output unit 240 that outputs a sound, a communication unit 250 that communicates with other electronic devices 100, 310, 320, and 330 of the vehicle 1, and a controller 210 that controls an overall operation of the AVN device 200.

Here, the user interface 220 may include a touch screen 221 that receives the control instructions from the driver and displays various image information according to the driver's control instructions. The touch screen 221 may receive the driver's control instructions, may visually display various information corresponding to the control instructions input by the driver, and may include a touch panel (not shown) that detects whether the driver touches the touch panel or the driver's touch coordinates, a display (not shown) that displays image information, and a touch screen controller (not shown) that controls an operation of the touch screen 221.

Also, the communication unit 250 may include a CAN communication module 251 that communicates with other electronic devices 100, 310, 320, and 330 included in the vehicle 1 using the CAN communication protocol.

The controller 210 controls an overall operation of various configurations included in the AVN apparatus 200.

For example, if an image display request is received from the gesture recognition apparatus 100 through the communication unit 250, the controller 210 may control the touch screen 221 of the user interface 220 and the sound output unit 240 so that the image may be displayed.

As described above, the gesture recognition apparatus 100 and the AVN device 200 are separately disposed and communicate with each other. However, embodiments of the present invention are not limited thereto. For example, the gesture recognition apparatus 100 and the AVN device 200 may be integrally disposed, and the AVN device 200 may receive the driver's control instructions through the gesture recognition apparatus 100.

However, hereinafter, it is assumed that the gesture recognition apparatus 100 and the AVN device 200 are separately disposed for understanding.

As above, configurations of the vehicle 1 and the gesture recognition apparatus 100 have been described.

Hereinafter, operations of the vehicle 1 and the gesture recognition apparatus 100 will be described. First, an operation of registering the driver's vein pattern using the vehicle 1 and the gesture recognition apparatus 100 will be described.

A method (1000) of registering a vein pattern of the vehicle 1 will be described with reference to FIGS. 7 through 14.

Figure 7:
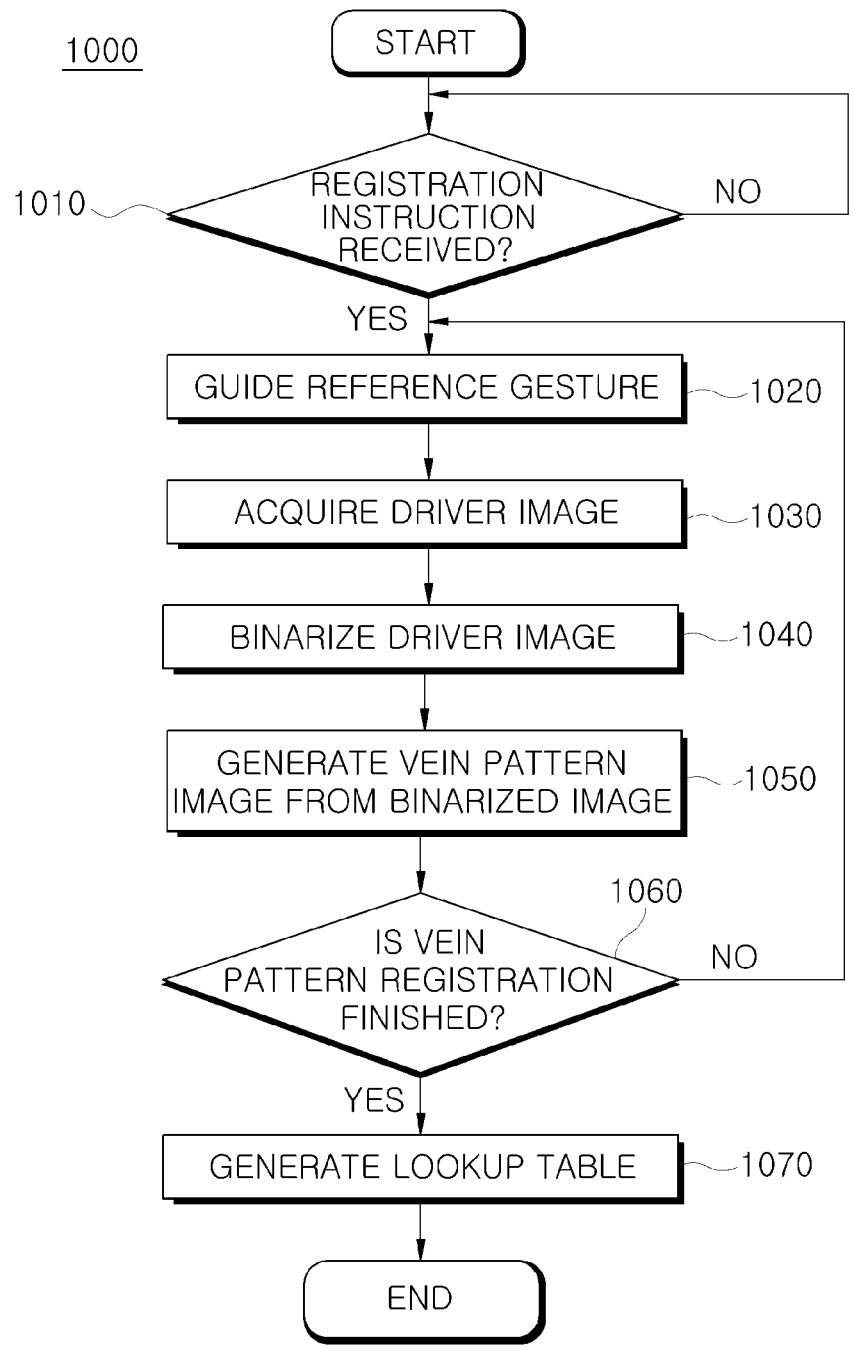
FIG. 7 is a flowchart of an operation of registering a vein pattern using the vehicle, according to an embodiment of the present invention.
Figure 8:
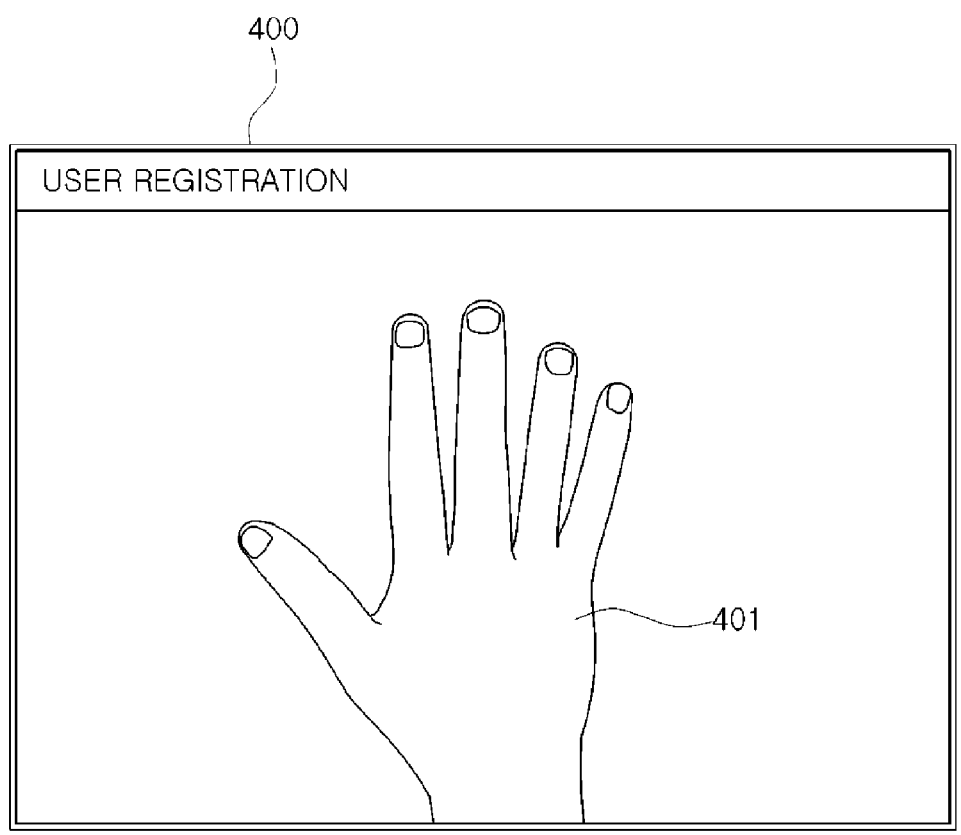
FIG. 8 is a view of an example of a reference gesture image for registering a driver's vein pattern using the vehicle, according to an embodiment of the present invention.
Figure 9:
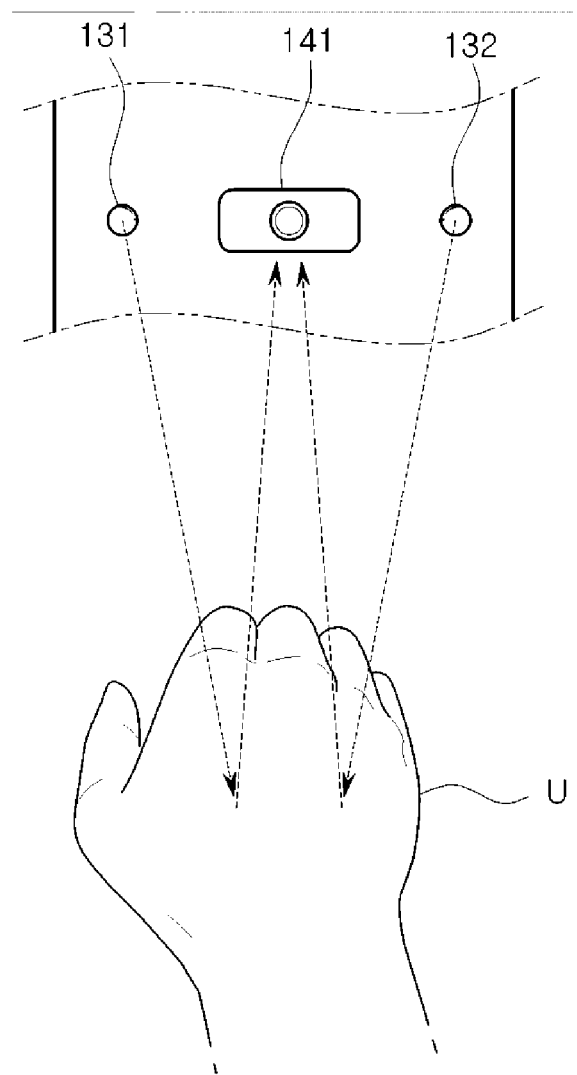
FIG. 9 is a view of an example in which the vehicle, according to an embodiment of the present invention, acquires a driver's image.
Figure 10:
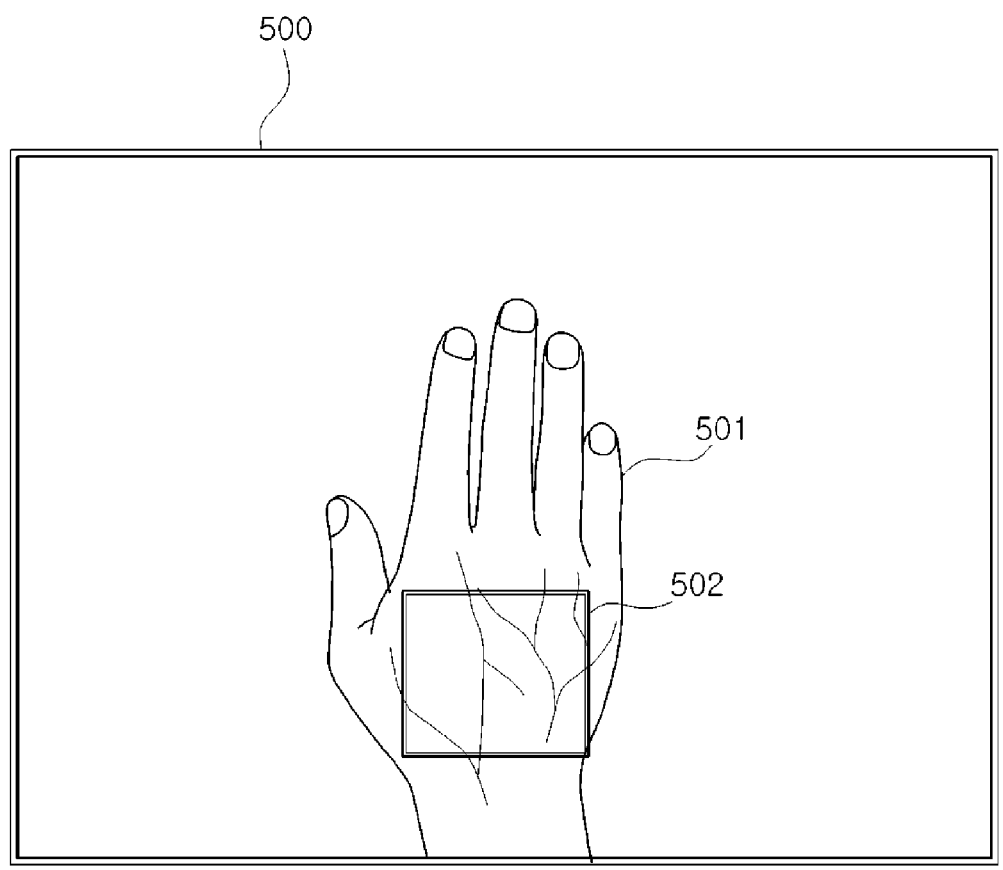
FIG. 10 is a view of an example of the driver's image acquired using the vehicle, according to an embodiment of the present invention.
Figure 11:
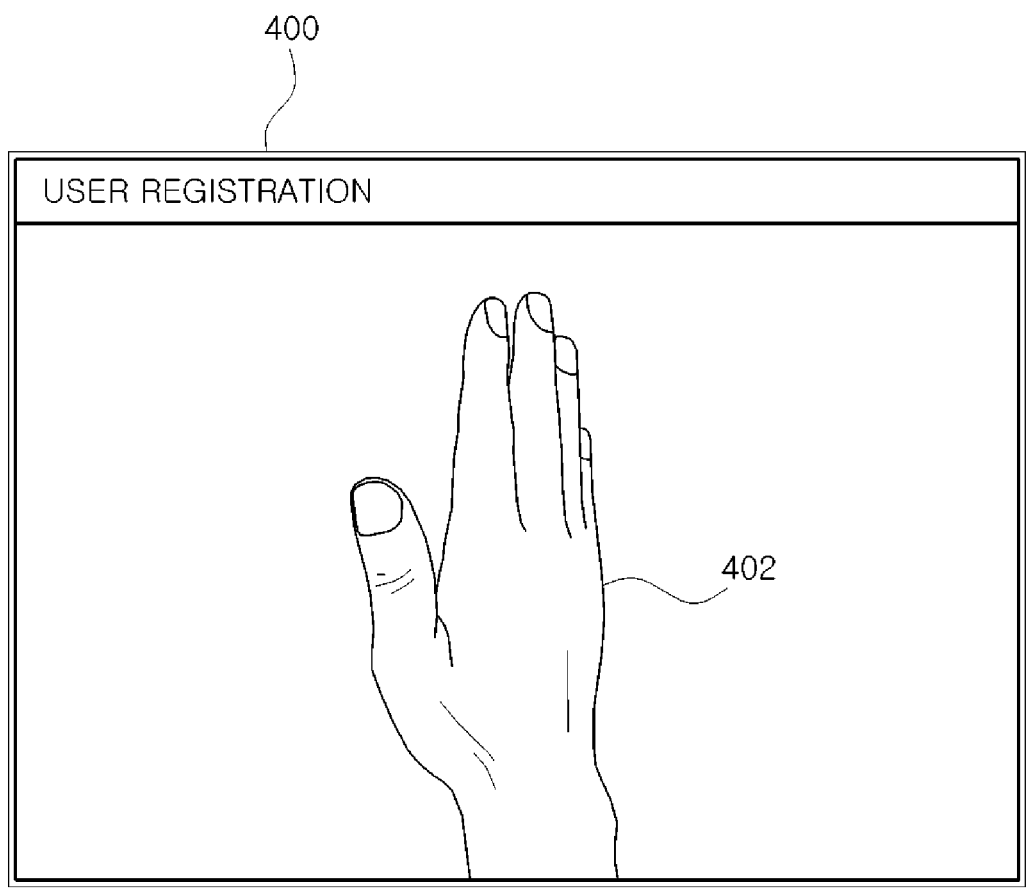
FIG. 11 is a view of another example of a reference gesture image for registering the driver's vein pattern using the vehicle, according to an embodiment of the present invention.
Figure 12:
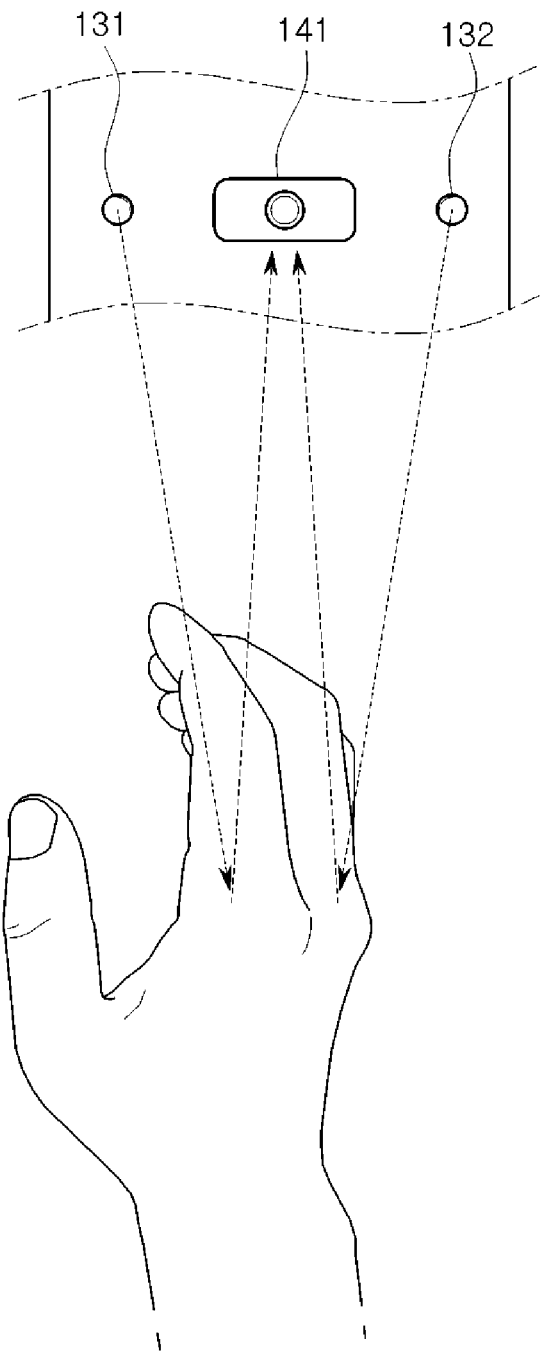
FIG. 12 is a view of another example in which the vehicle, according to an embodiment of the present invention, acquires the driver's image.
Figure 13:
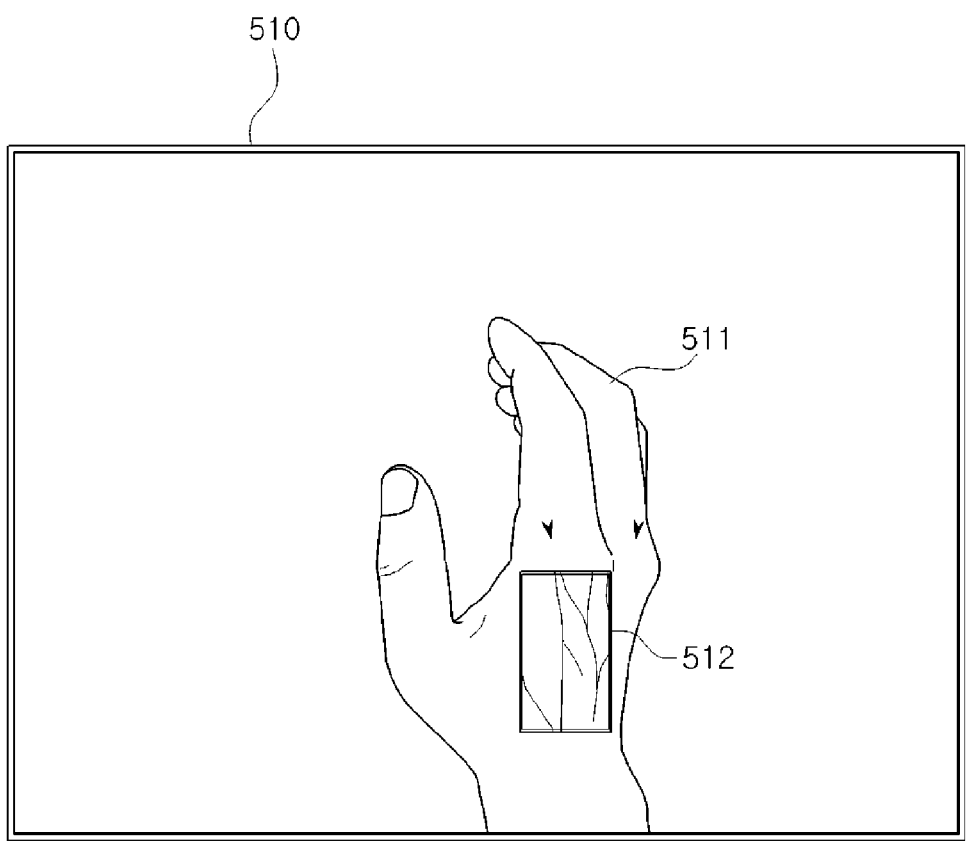
FIG. 13 is a view of another example of the driver's image acquired using the vehicle, according to an embodiment of the present invention.
Figure 14:
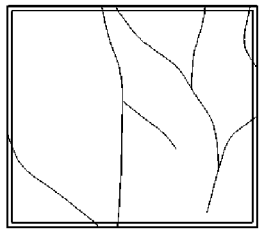
FIG. 14 is a view of a lookup table generated by the vehicle, according to an embodiment of the present invention.
Figure 14:
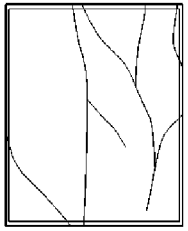
Figure 14:
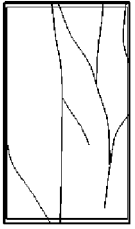

FIG. 7 is a flowchart of an operation of registering a vein pattern using the vehicle according to an embodiment of the present invention. FIG. 8 is a view of an example of a reference gesture image for registering a driver's vein pattern using the vehicle according to an embodiment of the present invention. FIG. 9 is a view of an example in which the vehicle according to an embodiment of the present invention acquires the driver's image. FIG. 10 is a view of an example of the driver's image acquired using the vehicle according to an embodiment of the present invention. FIG. 11 is a view of another example of a reference gesture image for registering the driver's vein pattern using the vehicle, according to an embodiment of the present invention. FIG. 12 is a view of another example in which the vehicle according to an embodiment of the present invention acquires the driver's image. FIG. 13 is a view of another example of the driver's image acquired using the vehicle according to an embodiment of the present invention. FIG. 14 is a view of a lookup table generated by the vehicle according to an embodiment of the present invention.

The vehicle 1 determines whether to register a driver U (at block 1010). In detail, the vehicle 1 may determine whether vein pattern registration instructions are input from the driver U.

The driver U may input vein pattern registration instructions to the vehicle 1 using various methods. For example, the driver U may input the vein pattern registration instructions through the input button 121 of the gesture recognition apparatus 100. If the driver's vein pattern registration instructions are input, the gesture recognition apparatus 100 may perform a preparation operation for registering a vein pattern. The gesture recognition apparatus 100 may emit infrared rays using the light-emitting unit 130 and may acquire an infrared image using the image acquisition unit 140.

As another example, the driver U may input the vein pattern registration instructions through the touch screen 221 of the AVN device 200. If the driver U inputs the vein pattern registration instructions using the AVN device 200, the AVN device 200 transmits the vein pattern registration instructions to the gesture recognition apparatus 100 using the communication unit 250. Also, if the vein pattern registration instructions are received through the communication unit 150, the gesture recognition apparatus 100 may perform the preparation operation for registering the vein pattern.

If it is determined to register the driver U (YES of 1010), the vehicle 1 guides a reference gesture for registering the vein pattern (at block 1020). In detail, the AVN device 200 may display a reference gesture image for registering the vein pattern according to a request of the gesture recognition apparatus 100.

The gesture recognition apparatus 100 may request the AVN device 200 to display the reference gesture image for registering the driver U's vein pattern. Also, if displaying of the reference gesture image is requested from the gesture recognition apparatus 100, the AVN device 200 may display the previously-stored reference gesture image on the touch screen 221 or may display the reference gesture image received from the gesture recognition apparatus 100 on the touch screen 221.

For example, the AVN device 200 may display a first reference gesture image 401 on a screen 400 of the touch screen 221, as illustrated in FIG. 8. A first reference gesture may be a hand gesture in which the driver U unfolds his/her fingers and the back of the driver's hand is directed upward, as displayed in the first reference gesture image 401.

Also, the AVN device 200 may guide the driver U to make the same gesture as an image displayed on the touch screen 221 by playing voice instructions using the sound output unit 240.

Subsequently, the vehicle 1 acquires a driver's image (at block 1030). In detail, the gesture recognition apparatus 100 acquires the driver's image using the image acquisition unit 140 and analyzes the acquired driver's image.

The driver U may make the same gesture as the reference gesture image displayed on the touch screen 221 of the AVN device 200.

For example, if the first reference gesture image 401 is displayed on the AVN device 200, the driver U may put his/her hand on the center console 35 and may make the first reference gesture in which the back of the driver's hand is directed upward.

If the driver U makes the first reference gesture displayed in the first reference gesture image 401, infrared rays emitted from the light-emitting unit 130 of the gesture recognition apparatus 100 are reflected from the back of the driver's hand, as illustrated in FIG. 9.

Also, the image acquisition unit 140 of the gesture recognition apparatus 100 may acquire a first driver's image 501 from the infrared rays reflected from the hand of the driver U, as illustrated in FIG. 10.

In this case, the infrared rays may be reflected from the surface of the skin of the driver's hand and may be reflected from veins formed in the driver's hand by transmitting through the skin of the driver U. As a result, the image acquired by the image acquisition unit 140 may include the shape of the hand of the driver U and an image of veins formed in the hand of the driver U.

Since a person has a unique vein pattern, the vehicle 1 may recognize the driver U using the vein pattern formed in the hand of the driver U and may authenticate the driver U. In addition, the vehicle 1 may also recognize the gesture of the driver U using the shape of the vein pattern.

The gesture recognition apparatus 100 may remove other objects, except for the image of the driver's hand, from the first driver's image 501 so as to acquire a more precise vein pattern image.

In detail, the gesture recognition apparatus 100 performs image smoothing on the first driver's image 501. The vein pattern may be deleted from the first driver's image 501 on which image smoothing is performed, such that only the shape of the driver's hand remains in the first driver's image 501. The gesture recognition apparatus 100 may determine the image of the driver's hand from the first driver's image 501 on which image smoothing is performed. Subsequently, the gesture recognition apparatus 100 may delete all images except for the image of the driver's hand from the first driver's image 501.

In this way, the size of the first driver's image 501 from which all images except for the image of the driver's hand are removed, is reduced so that a time for image processing may be reduced.

Subsequently, the vehicle 1 binarizes the driver's image (at block 1040). In detail, the gesture recognition apparatus 100 included in the vehicle 1 binarizes the driver's image.

The driver's image may represent various brightnesses according to intensities of the infrared rays reflected from the hand of the driver U. For example, a portion in which the driver's hand is indicated, is displayed bright, and a portion in which the driver's hand is not indicated, is displayed dark. Also, a portion in which veins formed in the driver's hand are indicated, may be displayed dark compared to other portions of the driver's hand.

The gesture recognition apparatus 100 may simplify the driver's image and may binarize the driver's image so that the vein pattern included in the driver's image may be clear.

In other words, the gesture recognition apparatus 100 may transform the driver's image into a monochrome image including black and white.

For example, the gesture recognition apparatus 100 may transform a brightness value of a pixel included in the driver's image into "0" that indicates black and "1" that indicates white based on a predetermined reference brightness value.

In detail, the gesture recognition apparatus 100 may store "1" that indicates white if the brightness value of the pixel included in the driver's image is equal to or greater than the reference brightness value, and may store "0" that indicates black if the brightness value of the pixel included in the driver's image is less than the reference brightness value.

In this way, the binarized driver's image includes only "1" that indicates white and "0" that indicates black and is simplified compared to the driver's image acquired by the image acquisition unit 140.

As another example, the gesture recognition apparatus 100 may calculate the reference brightness value by analyzing a histogram of the driver's image and may binarize the driver's image according to the calculated reference brightness value. The histogram of the image can be the distribution of the number of pixels according to brightness values.

In detail, the gesture recognition apparatus 100 may generate the histogram of the driver's image from the driver's image. Subsequently, the gesture recognition apparatus 100 may perform histogram equalization on the driver's image. The driver's image may become clearer by histogram equalization. Subsequently, the gesture recognition apparatus 100 may calculate a reference brightness value from the histogram of the driver's image on which histogram equalization is performed. For example, the gesture recognition apparatus 100 may calculate the reference brightness value by averaging brightness values of all pixels included in the driver's image on which histogram equalization is performed.

In the binarized driver's image, the shape of the hand and the vein pattern are displayed more clearly compared to the driver's image acquired by the image acquisition unit 140.

Subsequently, the gesture recognition apparatus 100 generates a vein pattern image from the binarized driver's image (at block 1050). In detail, the gesture recognition apparatus 100 extracts a region of interest (ROI) from the binarized driver's image and generates a vein pattern image from an image within the ROI.

The driver's image acquired by the image acquisition unit 140 may include the driver's vein pattern and the shape of the driver's hand. The gesture recognition apparatus 100 may set an ROI including only the vein pattern of the driver U from the vein pattern image so as to extract the vein pattern of the driver U.

For example, the gesture recognition apparatus 100 may set an ROI based on the shape of the hand displayed in the first driver's image 501, as illustrated in FIG. 10. In detail, the gesture recognition apparatus 100 may set an ROI having a rectangular shape 502 based on a border in which a little finger and a hand body come into contact with each other from the first driver's image 501, a border in which an index finger and the hand body come into contact with each other, and both ends of a border between the hand body and the wrist. That is, the gesture recognition apparatus 100 may set a portion corresponding to the hand body (or the palm or the back of the hand) among the first driver's image 501, to an ROI.

Also, the gesture recognition apparatus 100 may store an image inside the ROI as a first vein pattern image 502. The first vein pattern image 502 may include only a pattern of veins in which the shape of the driver's hand is removed from the driver's image and which is formed in the hand body of the driver U, as illustrated in FIG. 10.

Subsequently, the gesture recognition apparatus 100 determines whether vein pattern registration is completed (at block 1060). In detail, the gesture recognition apparatus 100 may determine whether a vein pattern image corresponding to a plurality of reference gestures is generated.

The driver U may put his/her hand in various positions, may direct his/her hand in various directions, and may rotate his/her hand at several angles. Here, the position of the hand is a position in which the hand of the driver U is put inside the vehicle, and a direction of the hand is a direction in which a finger directs from the hand body, and a rotation angle of the hand is an angle at which the hand is rotated based on the arm.

In particular, when the driver U rotates the hand, the vein pattern acquired by the image acquisition unit 140 is transformed into a different shape according to a rotation angle of the hand. In detail, even when the driver U changes the position of the hand or the direction of the hand, the vein pattern itself is not changed. However, when the driver U rotates the hand, the shape of the vein pattern is changed and thus, it is difficult to authenticate the driver U or to recognize the gesture of the driver U.

For this reason, the gesture recognition apparatus 100 acquires the vein pattern image of the driver U regarding various reference gestures while the vein pattern is registered, and various reference gestures are gestures having varying rotation angles of the driver's hand.

In other words, the gesture recognition apparatus 100 may acquire the vein pattern image of the driver U at various rotation angles of the hand by rotating the hand of the driver U. For example, the gesture recognition apparatus 100 may acquire a vein pattern image from the back of the hand to the palm by rotating the hand of the driver U at about 180°.

In this way, in order to acquire the vein pattern image at various rotation angles of the hand, the gesture recognition apparatus 100 may display a reference gesture image for rotating the hand of the driver U using the AVN device 200 and may acquire the vein pattern image at various rotation angles of the driver's hand.

If it is determined that vein pattern registration is not completed (1060, No), the gesture recognition apparatus 100 continues the process of FIG. 7 from block 102, guides the reference gesture again (1020), acquires the driver's image (1030), binarizes the driver's image (1040), and generates the vein pattern image (1050).

After the vein pattern corresponding to the first reference gesture is generated, the gesture recognition apparatus 100 may generate a vein pattern image corresponding to a second reference gesture.

For example, the AVN device 200 may display a second reference gesture image 402 on the screen 400 of the touch screen 221, as illustrated in FIG. 11. Here, the second reference gesture may be a hand gesture in which the hand is rotated at about 30° from the first reference gesture, as displayed in the second reference gesture image 402.

The driver U may make the same gesture as the reference gesture image displayed on the touch screen 221 according to guide of the AVN device 200. In other words, the driver U may make the second reference gesture according to the second reference gesture image 402.

If the driver U makes the second reference gesture, the gesture recognition apparatus 100 may acquire a second driver's image 511 corresponding to the second reference gesture, as illustrated in FIGS. 12 and 13. The gesture recognition apparatus 100 that acquires the second driver's image 511 may binarize the second driver's image 511 and may generate a second vein pattern image 512 from the binarized second driver's image 511.

In this way, the gesture recognition apparatus 100 of the vehicle 1 repeatedly performs driver's image acquisition, driver's image binarization, and vein pattern image generation until a driver's image corresponding to all reference gestures is acquired.

If it is determined that vein pattern registration is completed (1060, YES), the gesture recognition apparatus 100 generates a vein pattern lookup table (at block 1070).

The gesture recognition apparatus 100 included in the vehicle 1 may generate a vein pattern lookup table by relating a rotation angle of the hand with a vein pattern image corresponding to the rotation angle of the hand, as illustrated in FIG. 14. Here, the rotation angle of the hand indicates a rotation angle of the hand according to each reference gesture.

For example, the first reference gesture displayed in the first reference gesture image (see 401 of FIG. 8) may be a reference gesture having a rotation angle of "30" degrees, and the first vein pattern image (see 502 of FIG. 10) generated to correspond to the first reference gesture may be related to a rotation angle of "0" degrees and may be stored.

Also, the second reference gesture displayed in the second reference gesture image (see 402 of FIG. 11) may be a reference gesture having a rotation angle of "30" degrees, and the second vein pattern image (see 512 of FIG. 13) generated to correspond to the second reference gesture may be related to a rotation angle of "30" degrees and may be stored.

As described above, the gesture recognition apparatus 100 may guide various reference gestures to the driver U and may acquire an image of a vein pattern formed in the hand of the driver U while guiding the reference gesture. Also, the gesture recognition apparatus 100 generates a vein pattern lookup table for driver authentication and driver gesture recognition based on the acquired vein pattern image.

Next, a case where the vehicle 1 and the gesture recognition apparatus 100 authenticate the driver U and recognize a gesture of the driver U using the vein pattern of the driver U, will be described.

Figure 15A:
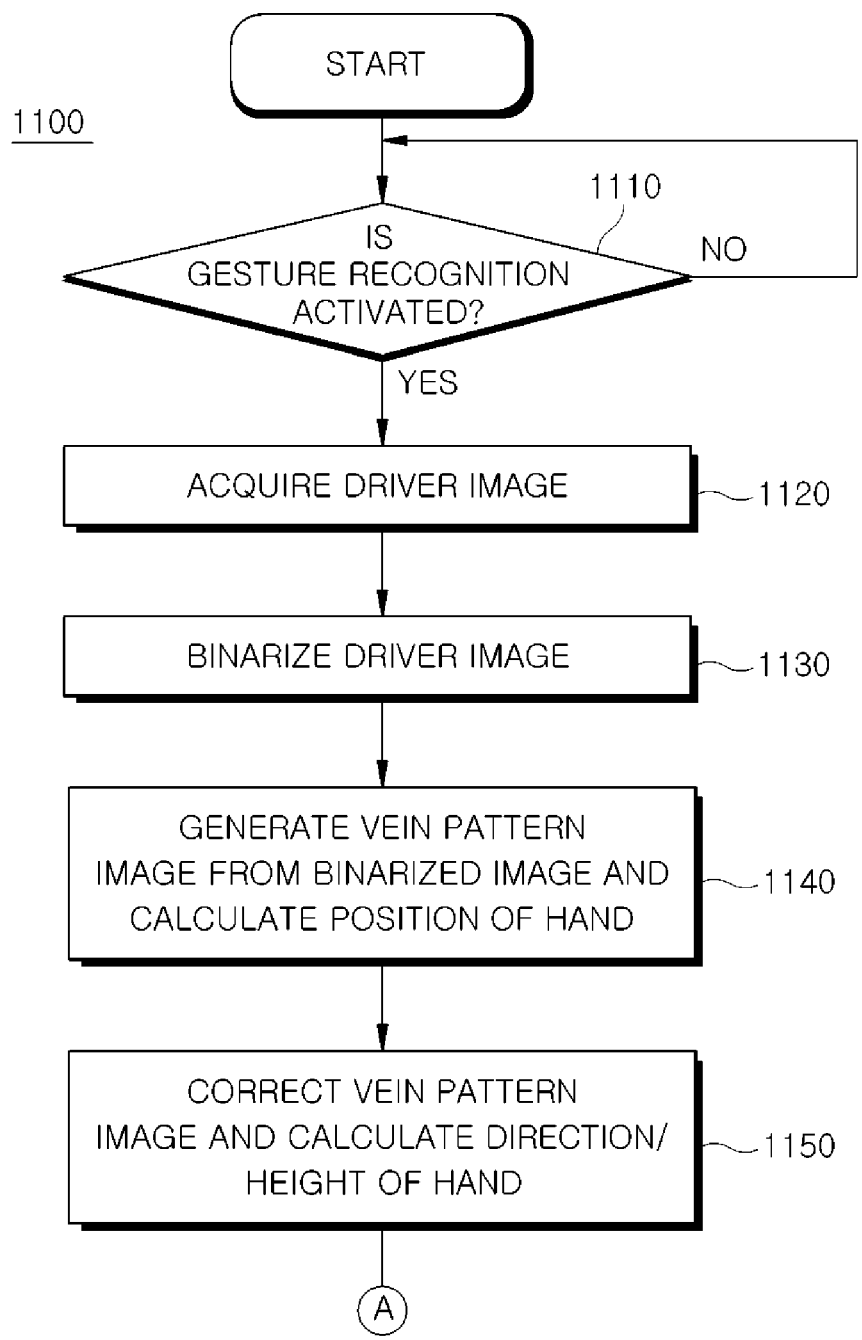
FIGS. 15A and 15B are flowcharts of a driver authentication and gesture recognition operation of the vehicle, according to an embodiment of the present invention.
Figure 15B:
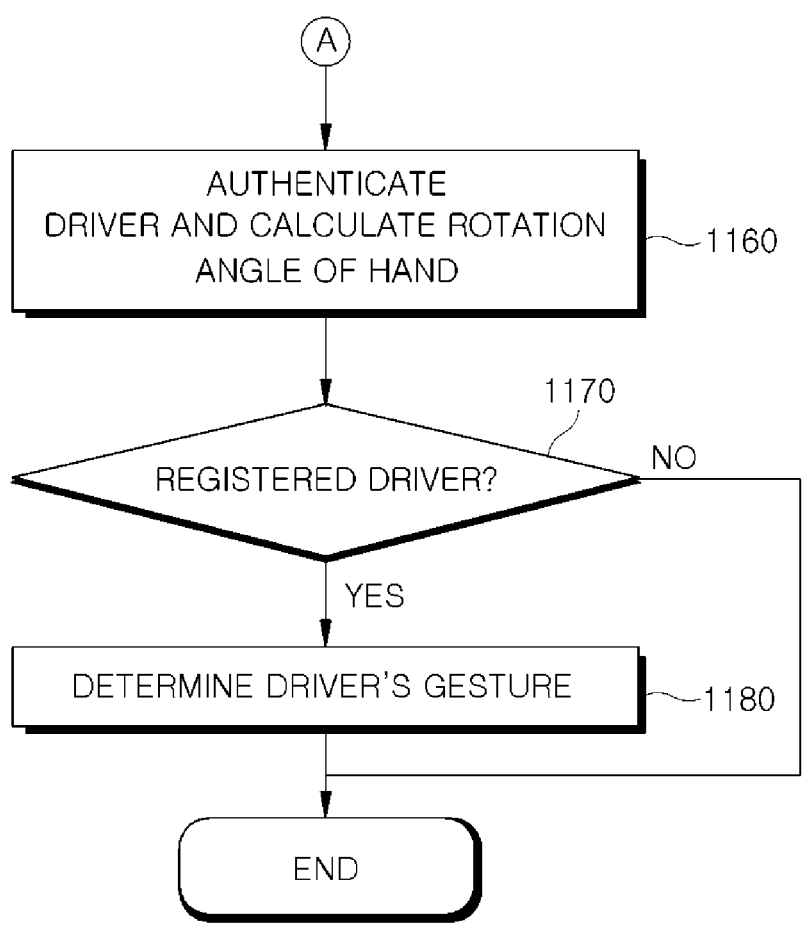
Figure 16:
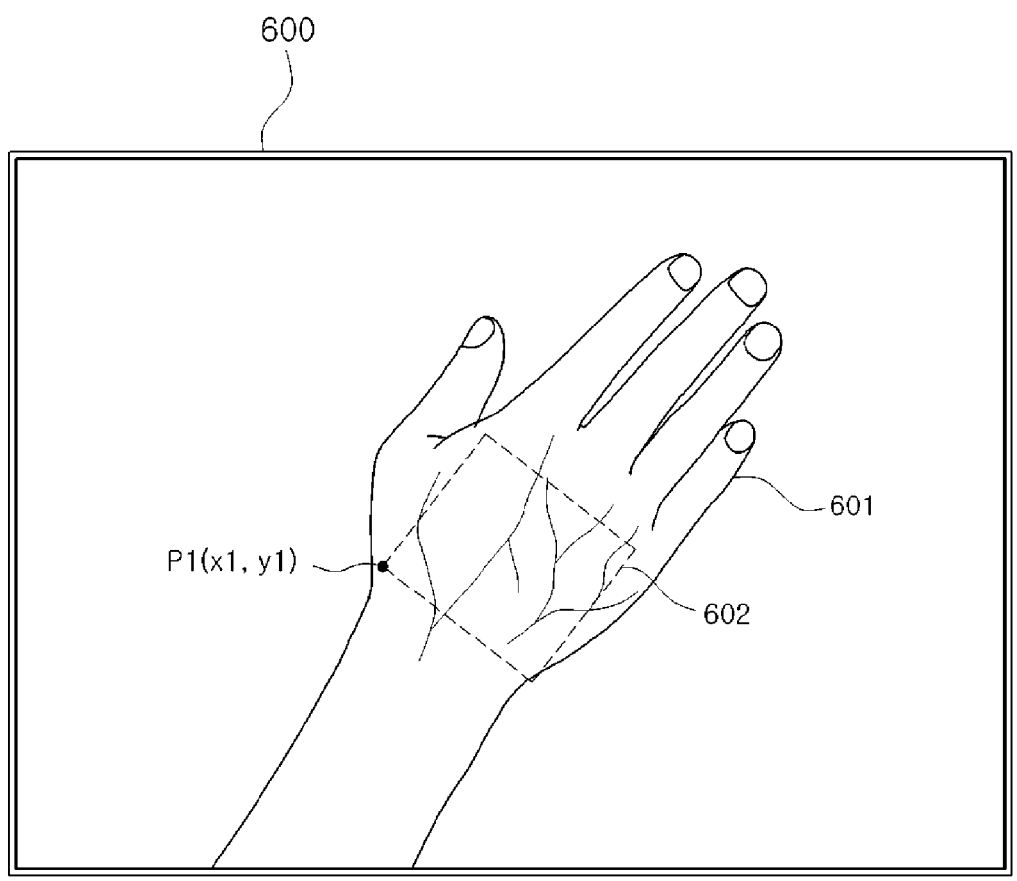
FIG. 16 is a view of an example of the driver's image acquired using the vehicle, according to an embodiment of the present invention so as to perform driver authentication and gesture recognition.
Figure 17:
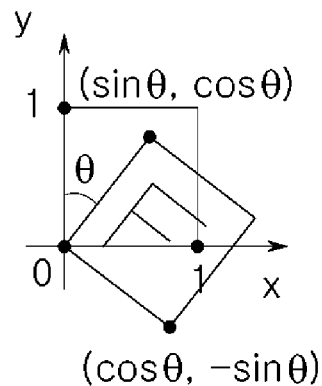
FIGS. 17 and 18 are views of an example in which the vehicle, according to an embodiment of the present invention, corrects the driver's vein pattern image.
Figure 17:
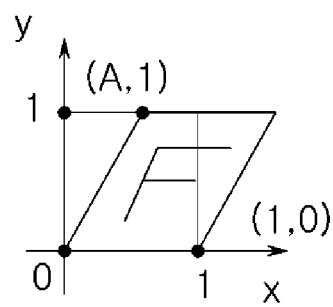
Figure 17:
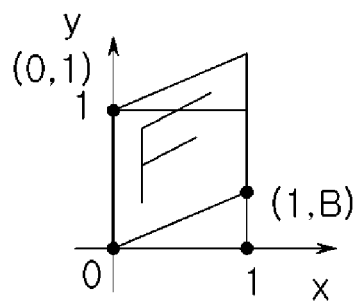
Figure 18:
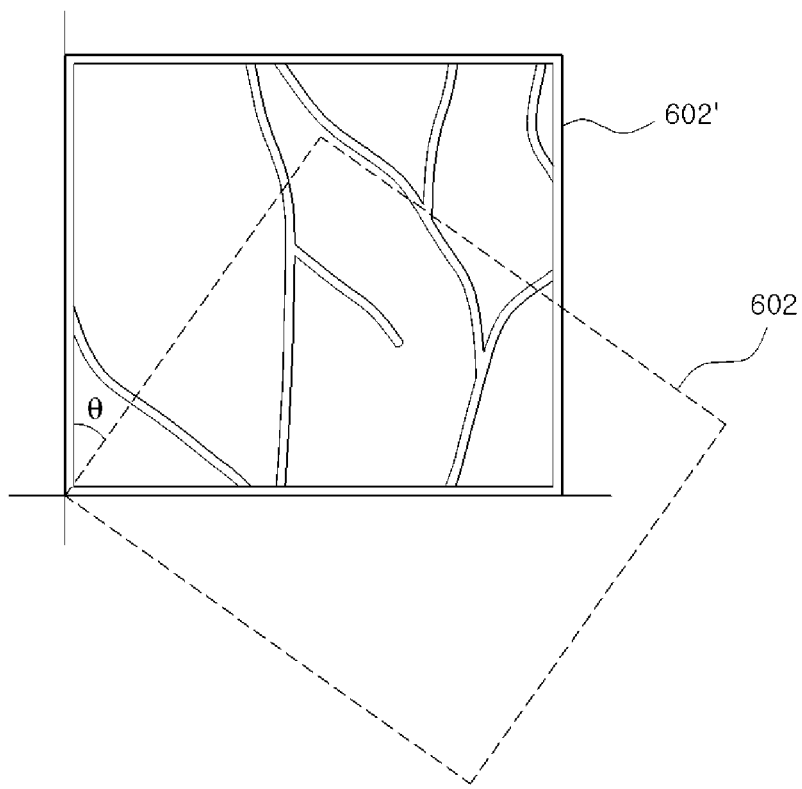
Figure 19:
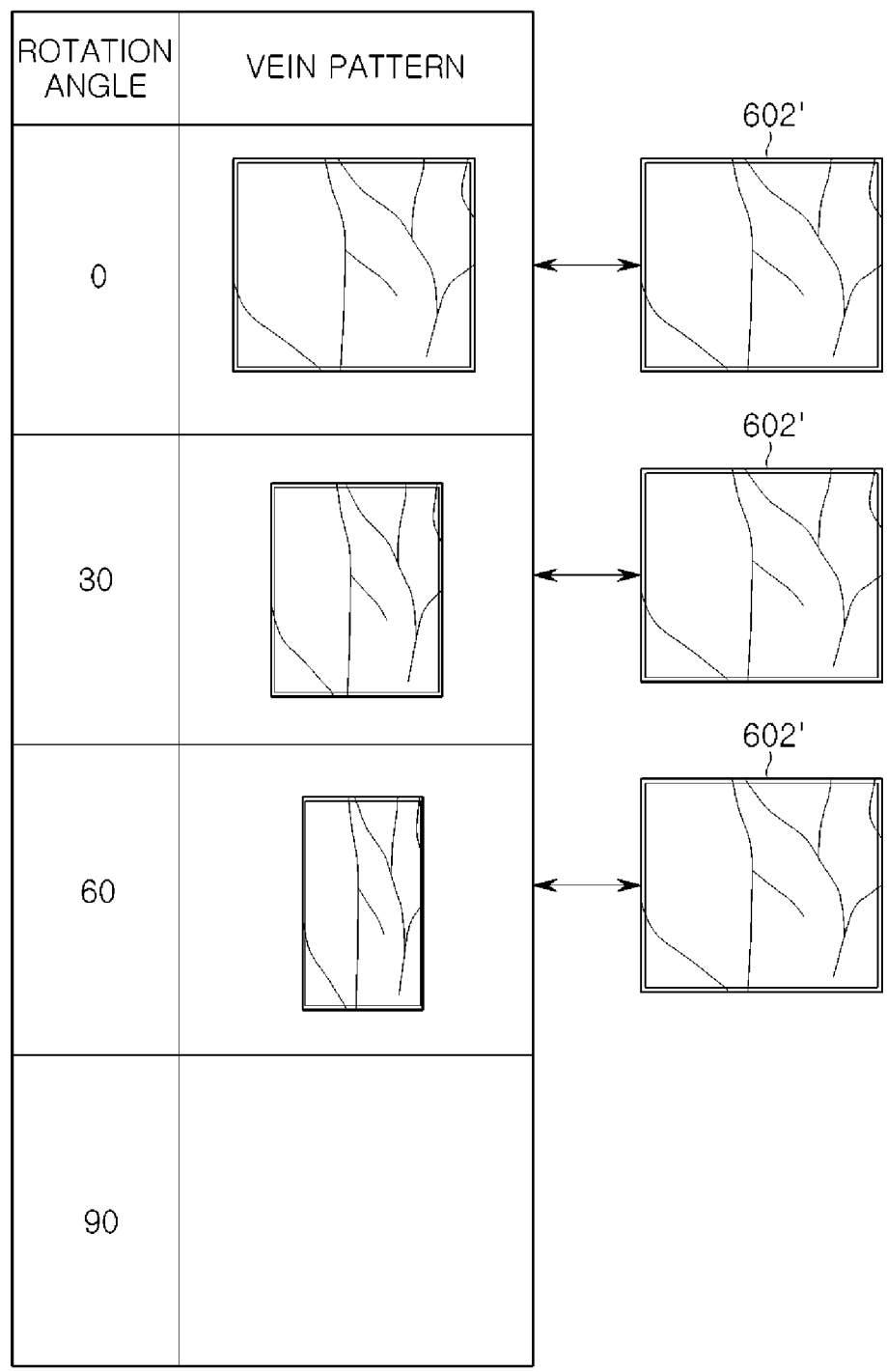
FIG. 19 is a view of an example in which the vehicle, according to an embodiment of the present invention, searches a vein pattern lookup table.
Figure 20:
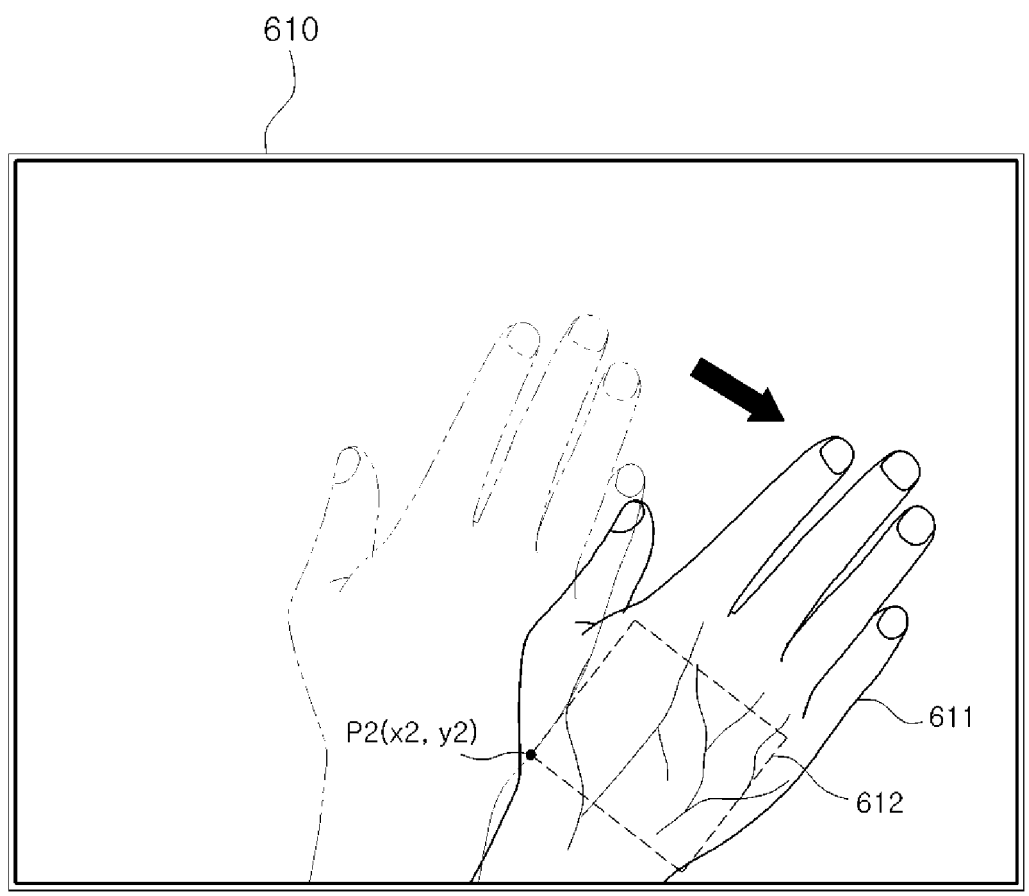
FIG. 20 is a view of another example of the driver's image acquired by the vehicle, according to an embodiment of the present invention, so as to perform driver authentication and gesture recognition.

FIGS. 15A and 15B are flowcharts of a driver authentication and gesture recognition operation of the vehicle according to an embodiment of the present invention. FIG. 16 is a view of an example of the driver's image acquired using the vehicle according to an embodiment of the present invention so as to perform driver authentication and gesture recognition. FIGS. 17 and 18 are diagrams of an example in which the vehicle according to an embodiment of the present invention corrects the driver's vein pattern image. FIG. 19 is a view of an example in which the vehicle according to an embodiment of the present invention searches a vein pattern lookup table. FIG. 20 is a view of another example of the driver's image acquired by the vehicle according to an embodiment of the present invention so as to perform driver authentication and gesture recognition.

A driver authentication and gesture recognition method (1100) using the gesture recognition apparatus 100 will be described with reference to FIGS. 15A through 20. In detail, a method for determining a stopping gesture of the driver U using the gesture recognition apparatus 100 will be described.

At block 1110, the gesture recognition apparatus 100 determines whether to activate gesture recognition. In detail, the gesture recognition apparatus 100 may determine whether gesture recognition activation instructions are input from the driver U.

The driver U may input gesture recognition activation instructions to the vehicle 1 using various methods. For example, the driver U may input the gesture recognition activation instructions through the input button 121 of the gesture recognition apparatus 100. If the gesture recognition activation instructions of the driver U are input, the gesture recognition apparatus 100 may perform a preparation operation for gesture recognition. The gesture recognition apparatus 100 may emit infrared rays using the light-emitting unit 130 and may acquire an infrared image using the image acquisition unit 140.

As another example, the driver U may input the gesture recognition activation instructions using the touch screen 221 of the AVN device 200. If the driver U inputs the gesture recognition activation instructions using the AVN device 200, the AVN device 200 transmits the gesture recognition activation instructions to the gesture recognition apparatus 100 using the communication unit 250. Also, if the gesture recognition activation instructions are received through the communication unit 150, the gesture recognition apparatus 100 may perform a preparation operation for gesture recognition.

As still another example, the driver U may input the gesture recognition activation instructions using a predetermined gesture. In this case, if the driver U enters the vehicle 1, the gesture recognition apparatus 100 may perform the preparation operation for gesture recognition, and if the driver U makes a predetermined gesture recognition activation gesture, the gesture recognition apparatus 100 may activate a gesture recognition function.

If gesture recognition is activated (1110, YES), the gesture recognition apparatus 100 acquires a driver's image (at block 1120). In detail, the gesture recognition apparatus 100 acquires the driver's image using the image acquisition unit 140 and analyzes the acquired driver's image.

The driver U may make a gesture corresponding to control instructions to be input to the vehicle 1. For example, if the driver U puts a right hand (left hand if a steering wheel is placed on the right of the vehicle) on the center console 35, the infrared rays emitted from the light-emitting unit 130 of the gesture recognition apparatus 100 may be reflected from the back of the hand of the driver U, and the image acquisition unit 140 of the gesture recognition apparatus 100 may acquire a driver's image 600 illustrated in FIG. 16.

As described above, the driver's image acquired by the image acquisition unit 140 may include the shape of the hand of the driver U and the pattern of veins formed in the hand of the driver U.

In this case, the gesture recognition apparatus 100 may remove an image except for the image of the driver's hand from the driver's image 600 so as to acquire a more precise vein pattern image.

In detail, the gesture recognition apparatus 100 performs image smoothing on the driver's image 600. A vein pattern is deleted from the driver's image 600 on which image smoothing is performed, and only the shape of the driver's hand remains in the driver's image 600. The gesture recognition apparatus 100 may determine the image of the driver's hand from the driver's image 600 on which image smoothing is performed. Subsequently, the gesture recognition apparatus 100 may delete all images except for the image of the driver's hand from the driver's image 600.

Subsequently, the gesture recognition apparatus 100 binarizes the driver's image (at block 1130). In detail, the gesture recognition apparatus 100 included in the vehicle 1 binarizes the driver's image.

The gesture recognition apparatus 100 may simplify the driver's image and may binarize the driver's image so that the vein pattern included in the driver's image may be clear. In other words, the gesture recognition apparatus 100 may transform the driver's image into a monochrome image including black and white.

For example, the gesture recognition apparatus 100 may transform a brightness value of a pixel included in the driver's image into "0" that indicates black and "1" that indicates white based on a predetermined reference brightness value.

As another example, the gesture recognition apparatus 100 may calculate the reference brightness value by analyzing a histogram of the driver's image and may binarize the driver's image according to the calculated reference brightness value.

In the binarized driver's image, the shape of the hand and the vein pattern are displayed more clearly compared to the driver's image acquired by the image acquisition unit 140.

Subsequently, the gesture recognition apparatus 100 generates a vein pattern image from the binarized driver's image and calculates the position of the hand of the driver U (at block 1140).

In detail, the gesture recognition apparatus 100 may extract an ROI from the binarized driver's image and may generate a vein pattern image from an image within the ROI.

For example, the gesture recognition apparatus 100 may set an ROI based on the shape of the hand displayed in the driver's image 600, as illustrated in FIG. 16. In detail, the gesture recognition apparatus 100 may set an ROI having a rectangular shape based on a border in which a little finger and a hand body come into contact with each other from the driver's image 600, a border in which an index finger and the hand body come into contact with each other, and both ends of a border between the hand body and the wrist. That is, the gesture recognition apparatus 100 may set a portion corresponding to the hand body (or the palm or the back of the hand) among the first driver's image 601, to an ROI.

Also, the gesture recognition apparatus 100 may store an image inside the ROI as a vein pattern image 602. The vein pattern image 602 may include only a pattern of veins from which the shape of the driver's hand is removed from the driver's image and which is formed in the hand body of the driver U, as illustrated in FIG. 16.

Also, the gesture recognition apparatus 100 may determine a position (x1, y2) of the hand of the driver U based on a position P1 of the ROI.

Subsequently, the gesture recognition apparatus 100 corrects a vein pattern image and calculates a direction of the driver's hand (at block 1150). In detail, the gesture recognition apparatus 100 included in the vehicle 1 may rotation-transform the vein pattern image or may make parallel translation of the vein pattern image.

During driving, the driver U may put his/her hand in an arbitrary position, may direct an arbitrary direction by the hand, or may perform a gesture for inputting control instructions. In this way, in order to extract the vein pattern from the image of the driver's hand that is put in the arbitrary position and directs the arbitrary direction, the gesture recognition apparatus 100 may make Affine transformation of the vein pattern image.

Affine transformation includes translation, scaling, rotation, and shearing and may have a basic form shown in Equation 1.

$$T(x)=Ax+b \qquad \text{[Equation 1]}$$

where T(x) is Affine transformation, A is an arbitrary matrix, b is an arbitrary vector, and x is a vector to be transformed.

For example, in order to perform rotation transformation illustrated in diagram (a) of FIG. 17, the gesture recognition apparatus 100 may apply Equation 2.

$$\begin{bmatrix} x2 \\ y2 \end{bmatrix} = \begin{bmatrix} \cos\theta & \sin\theta \\ -\sin\theta & \cos\theta \end{bmatrix} \begin{bmatrix} x1 \\ y1 \end{bmatrix} \qquad \text{[Equation 2]}$$

where x2 and y2 are coordinates after transformation, θ is a rotation angle, and x1 and y1 are coordinates before transformation.

Also, in order to perform shearing illustrated in diagram (b) of FIG. 17, the gesture recognition apparatus 100 may apply Equation 3.

$$\begin{bmatrix} x2 \\ y2 \end{bmatrix} = \begin{bmatrix} 1 & A \\ 0 & 1 \end{bmatrix} \begin{bmatrix} x1 \\ y1 \end{bmatrix} \qquad \text{[Equation 3]}$$

where x2 and y2 are coordinates after transformation, A is transformation displacement, and x1 and y1 are coordinates before transformation.

Also, in order to perform shearing transformation illustrated in diagram (c) of FIG. 17, the gesture recognition apparatus 100 may apply Equation 4.

$$\begin{bmatrix} x2 \\ y2 \end{bmatrix} = \begin{bmatrix} 1 & 0 \\ B & 1 \end{bmatrix} \begin{bmatrix} x1 \\ y1 \end{bmatrix} \qquad \text{[Equation 4]}$$

where x2 and y2 are coordinates after transformation, B is transformation displacement, and x1 and y1 are coordinates before transformation.

By using this Affine transformation, the gesture recognition apparatus 100 may correct the vein pattern image so as to compare the vein pattern image with the vein pattern lookup table.

For example, when the driver U directs his/her hand toward an arbitrary direction θ, as illustrated in FIG. 17, the gesture recognition apparatus 100 may acquire the vein pattern image 602 having a rectangular shape inclined at θ, as illustrated in FIG. 18.

The gesture recognition apparatus 100 may acquire a corrected vein pattern image 602' as illustrated in FIG. 18 by performing rotation transformation on the vein pattern image 602 having the inclined rectangular shape.

Also, the gesture recognition apparatus 100 may calculate a direction directed by the hand of the driver U (an angle deviated from the front of the vehicle 1) based on the angle θ at which the vein pattern image 602 before transformation is inclined.

As another example, when the driver U puts his/her hand to an arbitrary height, the gesture recognition apparatus 100 may acquire the vein pattern image 602' having the same size as vein pattern images stored in the vein pattern lookup table by performing scaling transformation on the vein pattern image 602.

Also, the gesture recognition apparatus 100 may calculate the height of the hand of the driver U based on a difference between sizes of the vein pattern image 602 before transformation and the vein pattern image 602' after transformation.

Subsequently, the vehicle 1 authenticates the driver U and calculates a rotation angle of the driver's hand (at block 1160).

In detail, the gesture recognition apparatus 100 included in the vehicle 1 authenticates the driver U by comparing the corrected vein pattern image with the vein pattern lookup table.

For example, the gesture recognition apparatus 100 compares the vein pattern image 602' of the driver U with vein pattern images 502 and 512 stored in the vein pattern lookup table, as illustrated in FIG. 19. As a result of comparison, if the same vein pattern image as the vein pattern image 602' is retrieved from the vein pattern lookup table, the gesture recognition apparatus 100 may determine that the driver U is a registered driver. If the same vein pattern image as the vein pattern image 602' is not retrieved from the vein pattern lookup table, the gesture recognition apparatus 100 may determine that the driver U is an unregistered driver.

Also, the gesture recognition apparatus 100 may determine an angle at which the hand of the driver U is rotated based on the arm of the driver U, by comparing the vein pattern image with the vein pattern lookup table.

For example, the first vein pattern image 502 among vein pattern images of the vein pattern lookup table may be the same as the vein pattern image 602' of the driver U, as illustrated in FIG. 19, and the gesture recognition apparatus 100 may determine that the hand of the driver U is rotated at an angle of "0" (the back of the hand is directed upward).

Subsequently, the vehicle 1 determines whether the driver U is a registered driver (at block 1170).

In detail, if the same vein pattern image as the vein pattern image 602' is retrieved from the vein pattern lookup table, the gesture recognition apparatus 100 may determine that the driver U is authenticated, and if the same vein pattern image as the vein pattern image 602' is not retrieved from the vein pattern lookup table, the gesture recognition apparatus 100 may determine that the driver U is not authenticated.

If it is determined that the driver U is a registered driver (1170, YES), the vehicle 1 determines a stopping gesture of the driver U (at block 1180).

In detail, the gesture recognition apparatus 100 of the vehicle 1 may store the position of the driver's hand, a direction directed by the driver's hand, the height of the driver's hand, and a rotation angle of the driver's hand so as to determine the stopping gesture of the driver U.

If it is determined that the driver U is not a registered driver (1170, NO), the gesture recognition apparatus 100 terminates gesture recognition.

As described above, the vehicle 1 may determine the stopping gesture of the driver U using the vein pattern of the driver U. In detail, the vehicle 1 may determine the position of the driver's hand, the direction directed by the driver's hand, the height of the driver's hand, and the rotation angle of the driver's hand.

Also, the vehicle 1 may determine a continuous stopping gesture of the driver U, i.e., movement of the driver U, by performing a stopping gesture determination function of the driver described above on the continuously-acquired driver's images.

For example, after determining the stopping gesture of the driver U from the driver's image 600 illustrated in FIG. 16, the vehicle 1 may determine the stopping gesture of the driver U from a driver's image 610 illustrated in FIG. 20.

Subsequently, the vehicle 1 may determine the driver's movement, i.e., the driver's hand movement and rotation based on a difference between a position (x1, y1) of the driver's hand determined from the driver's image 600 illustrated in FIG. 16, a direction directed by the driver's hand, a height of the driver's hand and a rotation angle of the driver's hand and a position (x2, y2) of the driver's hand determined from the driver's image 610 illustrated in FIG. 20, a direction directed by the driver's hand, a height of the driver's hand and a rotation angle of the driver's hand.

Also, the vehicle 1 may determine control instructions to be input by the driver based on the driver's movement.

In this way, when the driver's gesture is determined using the vein pattern formed in the drivers hand, the vehicle 1 may distinguish the driver from a fellow passenger.

Figure 21:
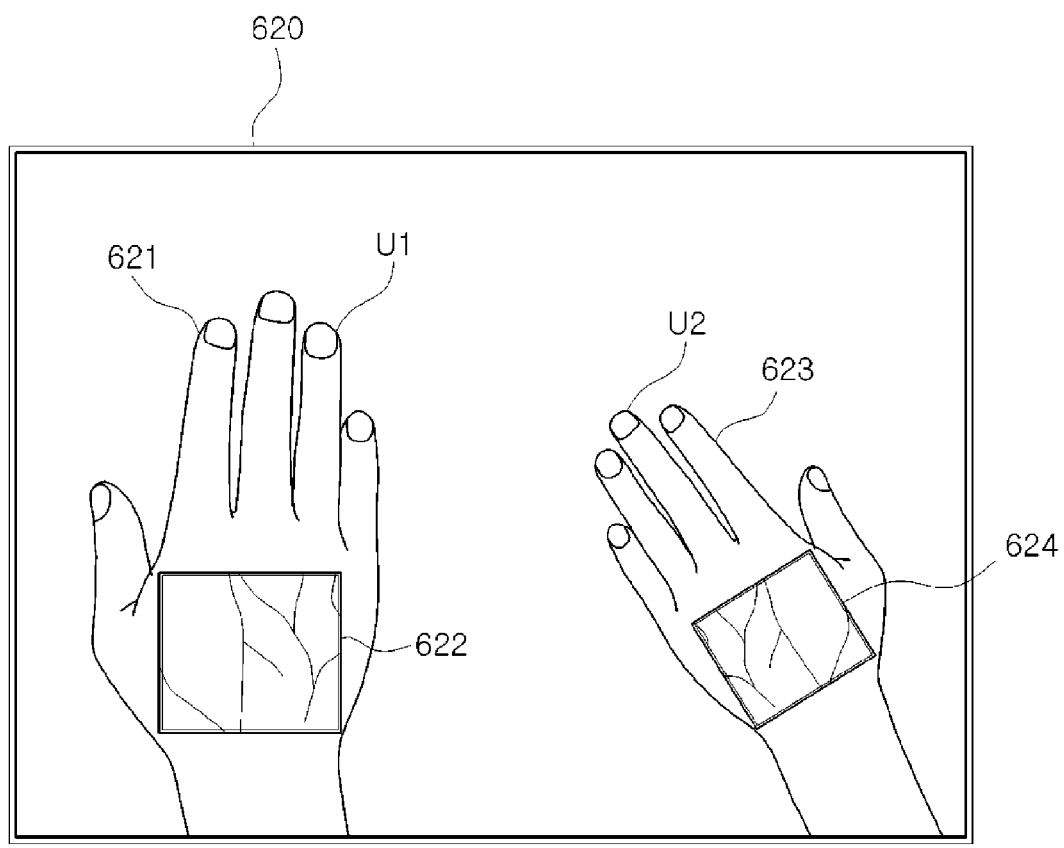
FIG. 21 is a view of still another example of the driver's image acquired by the vehicle, according to an embodiment of the present invention, so as to perform driver authentication and gesture recognition.

FIG. 21 is a view of still another example of the driver's image acquired by the vehicle according to an embodiment of the present invention so as to perform driver authentication and gesture recognition.

For example, when the gesture recognition apparatus 100 captures an image of a hand of a driver U1 and an image of a hand of a fellow passenger U2, as illustrated in FIG. 21, the gesture recognition apparatus 100 may separate an image 621 of the driver's hand and an image 623 of the fellow passenger's hand from a captured image 620.

Subsequently, the gesture recognition apparatus 100 may extract a vein pattern image 622 of the driver U1 and a vein pattern image 624 of the fellow passenger U2 from the image 621 of the driver's hand and the image 623 of the fellow passenger's hand.

Subsequently, the gesture recognition apparatus 100 may distinguish the vein pattern image 622 of the driver U1 from the vein pattern image 624 of the fellow passenger U2 by comparing the vein pattern image 622 of the driver U1 and the vein pattern image 624 of the fellow passenger U2 with the vein pattern lookup table.

As a result, the gesture recognition apparatus 100 may determine the driver's stopping gesture from the image 620 in which the driver U1 and the fellow passenger U2 are photographed, and may determine the driver's movement from the continuous stopping gesture of the driver. Also, the gesture recognition apparatus 100 may recognize the driver's control instructions from the driver's movement.

The vehicle 1 is not limited to recognize only the driver's gesture.

For example, when both the driver U1 and the fellow passenger U2 register vein patterns, the vehicle 1 may recognize both a gesture of the driver U1 and a gesture of the fellow passenger U2.

When the gesture recognition apparatus 100 capture both the image of the hand of the driver U1 and the image of the hand of the fellow passenger U2, as illustrated in FIG. 21, the gesture recognition apparatus 100 may separate the image 621 of the driver's hand and the image 623 of the fellow passenger's hand from the captured image 620, thereby acquiring the vein pattern image 622 of the driver U1 and the vein pattern image 624 of the fellow passenger U2.

Subsequently, the gesture recognition apparatus 100 may distinguish the vein pattern image 622 of the driver U1 from the vein pattern image 624 of the fellow passenger U2 by comparing the vein pattern image 622 of the driver U1 and the vein pattern image 624 of the fellow passenger U2 with the vein pattern lookup table.

The gesture recognition apparatus 100 may determine a stopping gesture of the driver U1 and a stopping gesture of the fellow passenger U2, respectively. Furthermore, the gesture recognition apparatus 100 may determine the movement of the driver U1 and the movement of the fellow passenger U2, respectively.

As a result, the gesture recognition apparatus 100 may receive control instructions through movement from the driver U1 and the fellow passenger U2.

As described above, the vehicle 1 and the gesture recognition apparatus 100 may extract the driver's vein pattern and may determine the driver's stopping gesture from the shape of the extracted vein pattern. Also, the vehicle 1 and the gesture recognition apparatus 100 may determine the driver's control instructions from the continuous stopping gesture of the driver.

As described above, a vehicle that detects a driver's gesture and recognizes control instructions corresponding to the detected gesture, a method for controlling the vehicle, and a gesture recognition apparatus included in the vehicle can be provided.

In addition, a vehicle that detects a vein pattern formed in the driver's hand so as to more precisely recognize the driver's gesture and detects the driver's gesture based on the detected vein pattern, a method for controlling the vehicle, and a gesture recognition apparatus included in the vehicle can be provided.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A gesture recognition apparatus for a vehicle, comprising:
    a storage unit to store a vein pattern lookup table including a plurality of reference vein pattern images according to a rotation angle of a driver's hand;
    an image acquisition unit to acquire a driver's image comprising an image of the driver's hand; and
    a controller to:
        extract a vein pattern image of the driver's hand from the driver's image;
        authenticate the driver by comparing the extracted vein pattern image with the vein pattern lookup table; and
        determine a gesture of the driver comprising at least one of a position of the driver's hand, a direction directed by the driver's hand and the rotation angle of the driver's hand based on the extracted vein pattern image,
    wherein the controller searches for a reference vein pattern image matched to the extracted vein pattern image among the plurality of reference vein pattern images and determines the rotation angle of the driver's hand based on the reference vein pattern image matched to the extracted vein pattern image.

2. The gesture recognition apparatus of claim 1, further comprising a audio video navigation (AVN) device to display a reference gesture image according to the rotation angle of the driver's hand.

3. The gesture recognition apparatus of claim 2, wherein, when the reference gesture image is displayed, the controller acquires a reference driver's image corresponding to the reference gesture image.

4. The gesture recognition apparatus of claim 3, wherein the controller binarizes the reference driver's image and extracts the reference vein pattern image from the binarized reference driver's image.

5. The gesture recognition apparatus of claim 4, wherein the controller generates the vein pattern lookup table based on the reference vein pattern image.

6. The gesture recognition apparatus of claim 1, wherein the controller is configured to determine a position of the driver's hand based on a position of the extracted vein pattern image.

7. The gesture recognition apparatus of claim 1, wherein the controller is configured to rotation-transform the extracted vein pattern image based on the plurality of reference vein pattern images and determines a direction directed by the driver's hand based on a rotation angle of the extracted vein pattern image.

8. The gesture recognition apparatus of claim 1, wherein the controller is configured to transform size of the extracted vein pattern image based on the plurality of reference vein pattern images and is configured to determine a height of the driver's hand based on a size transformation ratio of the extracted vein pattern image.

9. The gesture recognition apparatus of claim 1, wherein the controller determines a continuous driver gesture by processing a plurality of driver's images continuously acquired by the image acquisition unit and determines the driver's movement based on the continuous driver gesture by performing a stopping gesture determination function.

10. The gesture recognition apparatus of claim 9, wherein the controller determines control instructions of the driver, based on the driver's movement based on the result of image processing.

11. The gesture recognition apparatus of claim 1, wherein, when a plurality of vein pattern images are extracted from the driver's image, the controller distinguishes a plurality of drivers by comparing the plurality of vein pattern images with the vein pattern lookup table and authenticates the plurality of drivers distinguished based on the vein pattern images.

12. A method for controlling a vehicle, the method comprising:
    storing a vein pattern lookup table including a plurality of reference vein pattern images according to a rotation angle of a driver's hand;
    acquiring a driver's image including an image of the driver's hand;
    extracting a vein pattern image of the driver's hand from the driver's image;
    authenticating the driver by comparing the extracted vein pattern image with the vein pattern lookup table; and
    determining a gesture of the driver including at least one of a position of the driver's hand, a direction directed by the driver's hand and the rotation angle of the driver's hand based on the extracted vein pattern image,
    wherein the determining of the driver's gesture based on the extracted vein pattern image comprises:
        searching for a reference vein pattern image matched to extracted the vein pattern image among the plurality of reference vein pattern images; and
        determining the rotation angle of the driver's hand based on the reference vein pattern image matched to the extracted vein pattern image.

13. The method for claim 12, wherein the storing of the vein pattern lookup table comprises:

displaying a reference gesture image according to the rotation angle of the driver's hand;

acquiring a reference driver's image corresponding to the reference gesture image;

extracting the reference vein pattern image from the reference driver's image; and generating the vein pattern lookup table based on the reference vein pattern image.

14. The method for claim 12, wherein the determining of the driver's gesture based on the extracted vein pattern image comprises:

rotation-transforming the extracted vein pattern image based on the plurality of reference vein pattern images; and determining a direction directed by the driver's hand based on a rotation angle of the vein pattern.

15. The method for claim 12, wherein the determining of the driver's gesture based on the extracted vein pattern image comprises:

transforming size of the extracted vein pattern image based on the plurality of reference vein pattern images; and determining a height of the driver's hand based on a size transformation ratio of the extracted vein pattern image.

16. The method for claim 12, further comprising:

determining a continuous driver gesture by processing a plurality of driver's images continuously acquired by an image acquisition unit;

determining the driver's movement based on the continuous driver gesture; and determining the driver's control instructions based on the driver's movement.

17. The method for claim 12, wherein the authenticating of the driver comprises:

when a plurality of vein pattern images are extracted from the driver's image, distinguishing a plurality of drivers by comparing the plurality of vein pattern images with the vein pattern lookup table; and authenticating the plurality of drivers distinguished based on the vein pattern images.

18. A gesture recognition apparatus comprising:

a memory to store a vein pattern lookup table including a plurality of reference vain pattern images according to a rotation angle of a driver's hand;

a camera module to acquire a driver's image including an image of the driver's hand;

a graphic processor to extract a vein pattern image of the driver's hand from the driver's image and compare the extracted vein pattern image with the vein pattern lookup table; and a main processor to determine the driver's gesture including at least one of a position of the driver's hand, a direction directed by the driver's hand and the rotation angle of the driver's hand based on the extracted vein pattern image, wherein the graphic processor searches for a reference vein pattern image matched to the extracted vein pattern image among the plurality of reference vein pattern images, and the main processor determines the rotation angle of the driver's hand based on the reference vein pattern image matched to the extracted vein pattern image.

19. The gesture recognition apparatus of claim 18, wherein the main processor determines a position of the driver's hand based on a position of the extracted vein pattern image.

20. The gesture recognition apparatus of claim 18, wherein the graphic processor rotation-transforms the extracted vein pattern image based on the plurality of reference vein pattern images, and the main processor determines a direction directed by the driver's hand based on a rotation angle of the extracted vein pattern image.

21. The gesture recognition apparatus of claim 18, wherein the graphic processor transforms size of the extracted vein pattern image based on the plurality of reference vein pattern images, and the main processor determines a height of the driver's hand based on a size transformation ratio of the extracted vein pattern image.

* * * * *